(12) United States Patent
Weixler

(10) Patent No.: US 10,688,575 B2
(45) Date of Patent: Jun. 23, 2020

(54) APPARATUS AND METHOD FOR CHAMFERING A WORKPIECE WITH INTERNAL GEARING

(71) Applicant: Liebherr-Verzahntechnik GmbH, Kempten (DE)

(72) Inventor: Johannes Weixler, Durach (DE)

(73) Assignee: LIEBHERR-VERZAHNTECHNIK GMBH, Kempten (DE)

( * ) Notice: Subject to any disclaimer, the term of this patent is extended or adjusted under 35 U.S.C. 154(b) by 122 days.

(21) Appl. No.: 16/001,870

(22) Filed: Jun. 6, 2018

(65) Prior Publication Data

US 2018/0345392 A1 Dec. 6, 2018

(30) Foreign Application Priority Data

Jun. 6, 2017 (DE) .................. 10 2017 112 450

(51) Int. Cl.
| | | |
|---|---|---|
| *B23F 19/10* | (2006.01) | |
| *B23F 23/06* | (2006.01) | |
| *B23F 21/00* | (2006.01) | |
| *B23F 21/16* | (2006.01) | |
| *B23F 23/00* | (2006.01) | |
| *B23F 23/04* | (2006.01) | |

(52) U.S. Cl.
CPC .......... *B23F 19/104* (2013.01); *B23F 19/102* (2013.01); *B23F 21/005* (2013.01); *B23F 21/16* (2013.01); *B23F 23/006* (2013.01); *B23F 23/04* (2013.01); *B23F 23/06* (2013.01)

(58) Field of Classification Search
CPC ........ B23F 1/00; B23F 19/102; B23F 19/104; B23F 21/005; B23F 21/16; B23F 23/006; B23F 23/04; B23F 23/06
See application file for complete search history.

(56) References Cited

U.S. PATENT DOCUMENTS 2,114,627 A   4/1938   Carlsen
2,433,201 A * 12/1947  Cross .................... B23F 19/101
                                                      409/9
(Continued)

FOREIGN PATENT DOCUMENTS

CN       103273142 A    9/2013
DE          736920 C    7/1943
(Continued)

OTHER PUBLICATIONS

Japanese Patent Office, Office Action Issued in Application No. 2018-100569, dated Aug. 6, 2019, 8 pages.
(Continued)

*Primary Examiner* — Jacob J Cigna
(74) *Attorney, Agent, or Firm* — McCoy Russell LLP

(57) ABSTRACT

The present disclosure relates to an apparatus for chamfering at least one edge of the gearing at the front side of a workpiece having internal gearing comprising at least one rotatably supported workpiece holder for holding the workpiece and comprising at least one rotatably supported tool holder for holding a chamfer hob, possibly a chamfer cut hob, wherein the tool holder is arranged at an internal hob arm whose free end can be traveled by a machine axis of the apparatus at least partly into the center opening formed by the internal gearing of the workpiece.

23 Claims, 16 Drawing Sheets

(56) References Cited

U.S. PATENT DOCUMENTS

| | | | | |
|---|---|---|---|---|
| 2,665,612 | A * | 1/1954 | Nubling | B23F 23/1262 409/41 |
| 3,570,367 | A * | 3/1971 | Looman | B23F 5/163 409/34 |
| 3,673,660 | A * | 7/1972 | Osplack | B23F 5/04 29/893.35 |
| 3,714,740 | A * | 2/1973 | Steinhardt | B23F 19/12 451/121 |
| 3,916,569 | A * | 11/1975 | Wydler | B23F 5/06 451/5 |
| 3,931,754 | A * | 1/1976 | Nishijima | B23F 5/163 409/35 |
| 4,058,938 | A * | 11/1977 | Harle | B23F 5/02 451/47 |
| 4,130,967 | A * | 12/1978 | Easton | B23F 1/02 451/123 |
| 6,227,775 | B1 * | 5/2001 | Klammer | B23F 1/065 409/25 |
| 7,103,793 | B2 | 9/2006 | Wolff et al. | |
| 7,377,731 | B1 * | 5/2008 | Arvin | B23F 19/12 409/11 |
| 8,769,820 | B2 | 7/2014 | Philippin et al. | |
| 2007/0020058 | A1 | 1/2007 | Peiffer et al. | |
| 2011/0027031 | A1 | 2/2011 | Zeller | |
| 2013/0121779 | A1 | 5/2013 | Geiser | |
| 2013/0225379 | A1 | 8/2013 | Kato et al. | |
| 2014/0234043 | A1 | 8/2014 | Nakahara et al. | |
| 2014/0294530 | A1 | 10/2014 | Geiser et al. | |
| 2015/0360307 | A1 | 12/2015 | Vogel | |
| 2017/0008109 | A1 * | 1/2017 | Wuerfel | B23F 23/1225 |
| 2017/0014924 | A1 * | 1/2017 | Philippin | B23F 23/04 |
| 2017/0072485 | A1 | 3/2017 | Weppelmann et al. | |
| 2017/0252843 | A1 | 9/2017 | Matsubara et al. | |
| 2018/0297134 | A1 | 10/2018 | Yoon et al. | |
| 2018/0345392 | A1 | 12/2018 | Weixler | |
| 2019/0314910 | A1 | 10/2019 | Weixler | |
| 2019/0314911 | A1 | 10/2019 | Weixler et al. | |

FOREIGN PATENT DOCUMENTS

| | | | | |
|---|---|---|---|---|
| DE | 8328237 | U1 | 7/1984 | |
| DE | 4122461 | C1 | 7/1992 | |
| DE | 19515043 | A1 | 10/1996 | |
| DE | 20320294 | U1 | 4/2004 | |
| DE | 10258549 | A1 * | 5/2004 | |
| DE | 10330474 | A1 | 2/2005 | |
| DE | 202007016740 | U1 | 3/2008 | |
| DE | 102008016497 | A1 | 10/2009 | |
| DE | 102009019433 | A1 | 11/2010 | |
| DE | 102009020771 | A1 * | 11/2010 | B23C 3/12 |
| DE | 102012008296 | A1 | 10/2013 | |
| DE | 102013015240 | A1 | 10/2014 | |
| DE | 102015012190 | B3 | 1/2017 | |
| EP | 0522448 | A1 * | 1/1993 | B23F 19/105 |
| EP | 0522453 | A1 * | 1/1993 | B23F 19/007 |
| EP | 3012056 | A1 | 4/2016 | |
| JP | 2006224228 | A | 8/2006 | |
| JP | 3830212 | B2 * | 10/2006 | |
| JP | 2007030159 | A | 2/2007 | |
| WO | 2015185186 | A1 | 12/2015 | |

OTHER PUBLICATIONS

Japanese Patent Office, Office Action Issued in Application No. 2018-100570, dated Aug. 6, 2019, 17 pages.

Weixler, J., "Apparatus and Method for Chamfering a Workpiece Having Internal Gearing," U.S. Appl. No. 16/001,872, filed Jun. 6, 2018, 31 pages.

United States Patent and Trademark Office, Office Action Issued in U.S. Appl. No. 16/001,872, dated Nov. 15, 2019, 32 pages.

* cited by examiner

APPARATUS AND METHOD FOR CHAMFERING A WORKPIECE WITH INTERNAL GEARING

CROSS REFERENCE TO RELATED APPLICATIONS

The present application claims priority to German Patent Application No. 10 2017 112 450.0, entitled "APPARATUS AND METHOD FOR CHAMFERING A WORKPIECE WITH INTERNAL GEARING," and filed on Jun. 6, 2017. The contents of the above-listed application is hereby incorporated by reference in its entirety for all purposes.

TECHNICAL FIELD

The present disclosure relates to an apparatus and to a method for chamfering at least one front-side edge of the gearing of a workpiece having internal gearing comprising at least one rotatably supported workpiece holder for holding the workpiece and comprising at least one rotatably supported tool holder for holding at least one chamfer hob. The chamfer hob can possibly be a chamfer cut hob.

BACKGROUND AND SUMMARY

On the machining of workpieces for manufacturing a gearing on the workpiece blank, sharp-edged material protrusions arise at the machined workpiece edges. These protrusions, called burrs, have to be removed by deburring the edges of the gearing since they are disruptive in the following processes or represent a risk of injury for the machine operator on a manual part handling. The edges of the gearing are additionally frequently also still provided with protective chamfers.

The chamfering of the workpieces typically takes place by adapted deburring tools subsequent to the manufacture of the gearing on the workpiece blank. There are multiple methods for this chamfering process according to other disclosures. The deburring method in accordance with DE 8328237 A and chamfer cut deburring in accordance with DE 20320294 A and DE 202007016740 A are above all used in mass production.

DE 20320294 A here shows the chamfer cut deburring using a so-called chamfer cut hob. Such a chamfer cut hob is a disk-shaped deburring tool that has cutting teeth and flutes at the periphery, possibly each having the same peripheral spacing. The cutting teeth have a helical extent in the peripheral direction. The chamfer cut hob has multiple threads, with one tooth being provided per thread. The cutting edges formed at the side of the teeth at the front in the direction of rotation are, however, disposed on a common circle of rotation.

The above-named chamfering methods are typically used for chamfering workpieces having an external gearing, for example in that the deburring tool is fixed on the same tool arbor together with the hobbing tool and is brought into engagement with the edges of the gearing after the hobbing process.

It is already known from DE 10 2013 015 240 A1 to use a chamfer hobbing station in which chamfer hobs, possibly chamfer cut hobs, are used in the tool spindle. It is furthermore set forth there that the apparatus shown there for chamfering internal gearings can also be arranged within a workpiece having internal gearing. With larger internal gearings, the apparatus should be arranged within the toothed workpiece on a fixed position console at the center of the machine table or at a support above the machine table and should thus serve the chamfer machining of internal gearings. With internal gearings with smaller inside diameters, the construction space is, however, no longer sufficient for this embodiment.

Furthermore, it is known from DE 10 2013 015 240 A1 that two chamfer hobs have to be used for chamfering the edges of the gearings on the upper side or lower side of the workpiece when the same cutting direction between the chamfer hob and the gearing is desired for both edges.

It is known from DE 10 2009 019 433 A1 for the chamfering of external gearings to machine both edges with the same chamfer hob, with the tool holder being rotated by 180° to provide the same cutting direction between the chamfer hob and the gearing. The chamfering of internal gearings is not described here. The embodiment known from this document furthermore requires a substantial construction effort.

In accordance with a first aspect, it is therefore an object of the present disclosure to provide an improved apparatus and an improved method for chamfering the edges of a gearing of a workpiece having internal gearing. In accordance with a second aspect, it is therefore an object of the present disclosure to provide an improved apparatus and an improved method for chamfering the edges of the gearing on the upper side and on the lower side with the same chamfer hob.

In a first aspect, the present disclosure comprises an apparatus for chamfering at least one front-side edge of the gearing of a workpiece having internal gearing, wherein the apparatus comprises at least one rotatably supported workpiece holder for holding the workpiece and at least one rotatably supported tool holder for holding at least one chamfer hob, possibly a chamfer cut hob. In accordance with the disclosure, provision is made in accordance with the first aspect that the tool holder is arranged at an internal hob arm whose free end can be traveled by a machine axle of the apparatus at least partly into the center opening formed by the internal gearing of the workpiece.

The embodiment of the apparatus in accordance with the disclosure enables a simplified gear cutting of internal gearings, possibly also of relatively small internal gearings, by the dipping of the free end of the internal hob arm into the center opening of the workpiece.

The apparatus in accordance with the disclosure is possibly adapted such that workpieces having internal gearings can be machined with an inner diameter that is disposed in a range between 50 mm and 800 mm. The apparatus possibly permits the machining of workpieces that have an inner diameter in the range between 150 mm and 500 mm.

The free end of the internal hob arm can possibly be traveled, starting from an upper side of the workpiece, through the center opening of the workpiece. The free end of the internal hob arm can further possibly be traveled out of the center opening of the workpiece.

A problem-free changing of the workpiece without reducing the functionality during chamfering is possible by the traveling ability of the internal hob arm.

When the present application speaks of an upper side or of a lower side of the workpiece or of an arrangement of components above, below or next to the workpiece, this does not mean that the workpiece holder has to have a vertical axis of rotation or that the upper side is arranged above the lower side in the vertical direction, or that a corresponding arrangement of the components actually takes place above or below the workpiece in the vertical direction or in a horizontal direction next to the workpiece.

These terms are rather only an indication of relative arrangements in a direction which is predefined by the axis of rotation of the workpiece and by which the upper side and the lower side of the workpiece are defined. That side is considered as the upper side of the workpiece from where the internal hob arm dips into the center opening of the internal gearing and/or that side of the workpiece is considered as the lower side of the workpiece that faces the tool holder.

Depending on the machine concept, an arrangement would also be conceivable in which the workpiece axis is arranged horizontally during machining, which would in turn require a horizontal alignment of the apparatus in accordance with the disclosure.

The tool holder arranged at the internal hob arm can possibly be traveled through the center opening of the workpiece to bring the chamfer hob into engagement with an edge of the gearing on the lower side of the workpiece. The apparatus hereby allows a chamfering of the edge of the gearing on the lower side of the workpiece which faces the workpiece holder and which would otherwise not be accessible. This is a problem that specifically occurs with internal gearings and that is solved by the use of the internal hob arm.

The free end of the internal hob arm can possibly be traveled so far through the center opening of the workpiece having internal gearing and held in the workpiece holder that the axis of rotation of the tool holder is located by at least 10% of the radius of the chamfer hob in the axial direction of the workpiece holder below the edge of the gearing on the lower side of the workpiece having internal gearing and held in the workpiece holder.

The internal hob arm can further possibly be traveled so far through the center opening of the workpiece that the axis of rotation of the tool holder is located by at least 20%, further possibly by at least 30%, below the edge of the gearing in the axial direction of the workpiece holder on the lower side of the workpiece having internal gearing and held in the workpiece holder.

In an embodiment of the present disclosure, the workpiece holder has a cup-shaped recess that permits a traveling of the chamfer hob below the edge of the gearing on the lower side of the workpiece facing the cup-shaped recess. The cup-shaped recess of the workpiece holder thus possibly permits the machining of the edge of the gearing on the lower side of the workpiece.

The depth of the cup-shaped recess possibly amounts, starting from a support edge for the lower side of the workpiece, to more than 50% of the radius of the chamfer hob, further possibly more than 60%, 70%, or 80% of the radius of the chamfer hob.

The side walls of the cup-shaped recess are further possibly set back so far in a radial direction that part of the radius of the chamfer hob can be arranged below the region of the workpiece not having teeth to machine the edges of the toothed region.

The apparatus is possibly adapted such that the machine axis over which the free end of the internal hob arm can be traveled into the center opening does not itself extend into the center opening of the workpiece. The machine axis is possibly arranged above or next to the workpiece holder. A particularly slim internal hob arm can be provided by this embodiment that is traveled as a whole over one or more axes arranged outside the workpiece. Relatively small internal gearings can hereby also be machined.

The machine axis can be adapted such that it enables a traveling of the internal hob arm in the axial direction of the workpiece holder. It is possibly a linear axis.

In a possible embodiment of the present disclosure, the internal hob arm has no travel axes, but traveling takes place over travel axes of a machining head at which it is arranged.

In an adaptation, the internal hob arm is arranged at a machining head arranged next to or above the workpiece holder and can be moved over it.

The machining head can have a machine axis for moving the internal hob arm in the axial direction of the workpiece holder and/or a pivot axis for pivoting the internal hob arm about a pivot axis perpendicular to the axis of rotation of the workpiece holder and/or to the axis of rotation of the tool holder and/or a machine axis for traveling the internal hob arm in a direction perpendicular to the axis of rotation of the workpiece holder and/or perpendicular to the axis of rotation of the tool holder. The machine axes are possibly NC axes that are moved via a control of the machine.

The machining head is possibly arranged at a machine column that is arranged next to the workpiece holder on a machine bed and that provides the travel axes.

The shape of the internal hob arm is initially not further defined within the framework of the present disclosure and is selected such that the free end of the internal hob arm or the tool holder together with the tool arranged thereat can dip into the center opening or can be led through the center opening by means of a traveling of the internal hob arm. The internal hob arm can be pivoted inwardly via the pivot axis of the apparatus in accordance with the helix angle of the gearing and with the lead angle of the tool without colliding with the internal gearing.

Internal hob arms of different sizes for holding different tools having different diameters can be provided for adaptation to different diameters of internal gearings. These arms can be designed as swappable within the apparatus via a suitable interface.

In an embodiment, the internal hob arm also at least extends in a direction perpendicular to the axial direction of the tool holder. The internal hob arm is furthermore possibly arranged or can be arranged by traveling a travel axis of the apparatus such that it also extends at least in the axial direction of the workpiece holder.

The main axis of the internal hob arm possibly extends perpendicular to the axial direction of the tool holder. The internal hob arm is further possibly arranged or can be arranged by traveling the machine axis, possibly a travel axis and/or pivot axis, of the apparatus such that the main axis of the internal hob arm extends at an angle to the axial direction of the workpiece holder which results from the helix angle of the internal gearing and the lead angle of the tool and/or that the main axis of the internal hob arm extends in an angular range of ±30°, possibly of 15°, to the axial direction of the workpiece holder.

In an embodiment of the present disclosure, the internal hob arm is arranged at a mount. It possibly extends, starting from a machining head arranged next to the workpiece holder, perpendicular to the axial direction of the tool holder and to the axial direction of the workpiece holder. Alternatively or additionally, the internal hob arm can form a hook shape together with the mount so that it extends spaced apart from the machining head. The drive of the tool holder is further possibly arranged at the mount.

In an embodiment of the present disclosure, a drivetrain is provided in the internal hob arm that connects a drive arranged at the body side through the internal hob arm to the tool holder arranged at the internal hob arm. The drive hereby no longer has to be arranged directly in the region of the tool holder and hereby no longer forms any interference contour.

The drivetrain can have a plurality of gears that mesh with one another and that are arranged along the internal hob arm. Further alternatively or additionally, the drivetrain can have a belt drive and/or chain drive extending within the internal hob arm.

The internal hob arm is designed in accordance with the disclosure such that it permits an engagement between the chamfer hob and the edge of the workpiece to be machined. It possibly has a relatively slim construction shape for this purpose.

The tool arbor of the tool holder may only carry a chamfer hob. The width of the internal hob arm, including the tool arbor, is hereby reduced since only a short tool arbor is required.

In a possible embodiment of the present disclosure, the width of a tool arbor amounts to less than 5 times the width of the chamfer hob, further possibly less than 3 times the width of the chamfer hob.

In a possible embodiment of the present disclosure, the width of the internal hob arm, including the width of the tool arbor, along the axis of the tool holder amounts to less than 10 times, possibly less than 5 times, the width of the chamfer hob. Alternatively or additionally, the width of the internal hob arm, including the tool arbor, along the axis of the tool holder can amount to less than 50% of the internal diameter of the gearing of the workpiece to be machined.

In a possible embodiment of the present disclosure, the maximum extent of the interference edge formed by the tool holder and/or by the free end of the internal hob arm, starting from a plane extending through the axis of rotation of the tool holder, is at least 10% smaller toward one side than the radius of a chamfer hob held in the tool holder, possibly at least 20% smaller, and further possibly at least 25% smaller.

The plane from which the distance from the interference edge is determined can be a center plane of the internal hob arm. The plane can extend in parallel with the axis of rotation of the workpiece in a possible embodiment. Alternatively, however, a plane inclined toward the axis of rotation of the workpiece holder can be used as the reference plane.

In an embodiment of the present disclosure, the apparatus has a sensor for threading and/or meshing the chamfer hob into the internal gearing of the workpiece.

Such a sensor is possibly required when the apparatus in accordance with the disclosure is designed as a stand-alone arrangement or when the workpiece whose edges are to be chamfered was previously arranged in a different workpiece holder during the manufacture of the gearing and is, for example, transported to the workpiece holder of the apparatus in accordance with the disclosure via a workpiece changer since in this case the position of the gearing relative to the apparatus is not known. It is possibly a contactless sensor. An inductive sensor and/or an optical sensor can be used, for example.

The sensor is possibly arranged at the internal hob arm. The sensor arranged at the internal hob arm is possibly traveled by means of the internal hob arm toward the gearing for determining the location of the gearing at the workpiece and the workpiece is rotated past the sensor via the workpiece holder. The location of the gearing can hereby be determined, for example by detecting the location of the tips.

The sensor is possibly arranged above or below the tool holder at the internal hob arm so that the chamfer hob does not form an interference edge when traveling the sensor to the gearing. The sensor can possibly dip into the center opening of the gearing by means of the internal hob arm and/or can be traveled toward the internal gearing. The sensor is possibly arranged below the tool holder at the free end of the internal hob.

In alternative embodiments, the sensor could, however, also be arranged at a separate arm for threading in and/or meshing the chamfer hob and is traveled into the internal gearing via said separate arm. An arrangement of the sensor outside the gearing would, for example, furthermore also be conceivable on the use of optical sensors.

The apparatus in accordance with the disclosure possibly allows at least the machining of the edge of the gearing on the lower side of the workpiece, possibly in that the free end of the internal hob arm together with the tool holder is traveled through the center opening of the workpiece formed by the internal gearing from the upper side of the workpiece to the lower side of the workpiece.

The apparatus in accordance with the disclosure can only be usable for machining the edge of the gearing on a front side of the workpiece in one possible embodiment. A further apparatus, that does not necessarily have to be designed in accordance with the disclosure, would then be used for machining the other edge of the workpiece.

In an alternative embodiment of the present disclosure, the apparatus is, however, configured such that it permits both the machining of the edge of the gearing on the upper side and on the lower side of the workpiece.

In the following, different embodiments of the present disclosure will now be described that possibly enable a machining of the edge of the gearing both on the upper side and on the lower side of the workpiece.

In a first embodiment, the apparatus comprises two tool holders for holding chamfer hobs, possibly chamfer cut hobs. A chamfer hob held in the one tool holder is possibly used for machining the edge of the gearing on the lower side; a chamfer hob held in the other tool holder is used for machining the edge of the gearing on the upper side.

The use of two tool holders and thus of two chamfer hobs for the machining of the edge at the upper side and at the lower side of the workpiece is possibly of advantage when different chamfer hobs have to be used for the upper side and the lower side due to the geometry of the workpiece. Two tool holders and/or two separate chamfer hobs are possibly used with conical workpieces or with workpieces having differently designed front surfaces at the gearing.

The use of two tool holders and thus of two chamfer hobs can also be advantageous when two different workpieces are to be alternately machined. The one chamfer hob is then used for chamfering the first workpiece and the other for chamfering the second workpiece.

The two tool holders are possibly travelable via at least one common machine axis. The construction effort is hereby reduced. The tool holders are particularly possibly travelable via a plurality of common machine axes. The plurality of tool holders can possibly be arranged at the same machining head.

The two tool holders are not travelable relative to one another in a possible embodiment of the present disclosure and are possibly rigidly arranged at a machining head.

The axes of rotation of the two tool holders possibly extend in parallel with one another.

The two tool holders are possibly drivable with reverse directions of rotation. The use of reverse directions of rotation for the two tool holders and thus for machining the edge on the upper side and on the lower side permits the machining of the upper side and of the lower side of the workpiece with the same cutting direction between the tool and the gearing in an embodiment. This has the effect that the burrs remaining on chamfering either remain at the front sides of the gearing on both sides or remain in the interior of the gearing on both sides.

In a first alternative, the two tool holders are arranged at the same internal hob arm. The two tool holders can possibly be arranged above one another along the internal hob arm.

The lower tool holder can possibly thus be arranged below the edge of the gearing on the lower side of the workpiece and the upper tool holder can be arranged above the edge of the gearing on the upper side of the workpiece during the chamfering of the edge of the gearing on the lower side of the workpiece and/or during the chamfering of the edge of the gearing on the upper side, with the internal hob arm extending through the center opening of the workpiece.

A chamber hob arranged in one of the tool holders can initially be brought into engagement with the one edge and then, by a traveling of the internal hob arm in the axial direction of the workpiece holder, a chamfer hob held in the other tool holder can be brought into engagement with the other edge.

In a second alternative, the two tool holders are arranged at separate internal hob arms. They are possibly arranged spaced apart from one another at a machining head in the axial direction of the tool holders. The internal hob arms possibly extend in parallel with one another, i.e. their main axes are aligned in parallel with one another.

The arrangement of the two internal hob arms and of the tool holders possibly takes place such that, on the machining of an edge of the workpiece by a chamfer hob arranged at the one internal hob arm, the other internal hob arm is arranged outside the workpiece, and vice versa.

The edge of the gearing on the lower side is possibly machined by a chamfer hob arranged at the one internal hob arm and the edge of the gearing on the upper side of the workpiece is possibly machined by a chamfer hob arranged at the other internal hob arm.

Alternatively or additionally, the two separate internal hob arms can, however, also be used when two different workpieces should be able to be machined without a tool change. In this case, a chamfer hob arranged at the internal hob arm can be used for machining both the edge of the upper side and the edge of the lower side of the one workpiece and a chamfer hob arranged at the other internal hob arm can be used for machining both the edge at the upper side and the edge at the lower side of the other workpiece.

In this case, internal hob arms of different geometries and/or construction sizes can also be provided, with the internal hob arms serving the holding of chamfer hobs having diameters of different sizes for machining internal gearings having different internal diameters and/or with the internal hob arms having different lengths to machine internal gearings in which the toothed region or regions is/are arranged at different depths in the workpiece. This can possibly also take place in each case as will be described in more detail in the following with respect to the second independent aspect of the present disclosure.

In a further embodiment of the present disclosure, the tool holder is rotatable about 180° via a pivot axis perpendicular to its axis of rotation. The pivot axis is possibly arranged at the internal hob arm. The pivot axis can possibly enable a pivoting of a lower part of the internal hob arm with the workpiece holder with respect to an upper part of the internal hob arm or with respect to a connection to the mount. The pivot axis possibly extends in parallel with the main axis of the internal hob arm and/or intersects the axis of rotation of the tool holder. The pivot axis further possibly extends in parallel with the axis of rotation of the workpiece holder when the axis of rotation of the tool holder stands perpendicular thereon. A chamfer machining of the edges on the upper side and on the lower side of the workpiece possibly takes place with a tool holder pivoted about 180° and with the same direction of rotation of the workpiece holder to obtain the same cutting direction with respect to the workpiece.

In a second independent aspect, the present disclosure comprises an apparatus for chamfering at least one frontside edge of the gearing of a toothed workpiece that has at least one rotatably supported workpiece holder for holding the workpiece and at least one rotatably supported tool holder for holding a chamfer hob, possibly a chamfer cut hob, with the tool holder being travelable over at least one machine axis relative to the workpiece holder. Provision is made in accordance with the second aspect that the apparatus permits a chamfering of the edges of the gearing on both front sides of the workpiece by the same chamfer hob in that a chamfer hob held in the tool holder is brought into engagement with an edge region of a first side of the workpiece in a first radial direction with respect to the axis of rotation of the workpiece and, by traveling the tool holder relative to the workpiece holder, is brought into engagement with a radially oppositely disposed edge region of the second side of the workpiece in a second radial direction with respect to the axial direction of the workpiece holder.

In addition to a travel by which the chamfer hob is brought into engagement with the second edge region, a pivoting of the tool holder possibly takes place about a pivot axis that extends perpendicular to the axis of rotation of the tool holder and/or of the workpiece holder. An adaptation of the alignment between the chamfer hob and the workpiece can hereby possibly be carried out to the lead angle of the chamfer hob and/or to the helix angle of the gearing.

Such a traveling of the chamfer hob to bring it into engagement with the edges of the gearing at the upper side and at the lower side of the workpiece in possibly opposite radial directions is possible both with internal gearings and with external gearings.

The chamfering of the edge of the gearing on the upper side of the workpiece possibly takes place with the same direction of rotation of the tool as the chamfering of the edge of the gearing on the lower side of the workpiece. The direction of rotation of the workpiece is, however, possibly reversed. The tool hereby has the cutting direction with respect to the gearing both for the upper side and for the lower side. Work is possibly carried out both on the upper side and on the lower side either with a cutting direction out of the gearing or with a cutting direction into the gearing. The burrs remaining after the chamfering at the upper side and at the lower side are hereby each arranged the same. i.e. either at the front side or in the region of the gearing.

The tool holder is possibly arranged at a hob arm, with a chamfer hob held in the tool holder being accessible from two sides disposed opposite one another with respect to the axis of rotation of the tool holder so that it can be brought into engagement at the first side with the edge region of the gearing on the upper side of the workpiece and at the second side with the edge region of the gearing on the lower side of the workpiece. The radius of the chamfer tool possibly projects at both sides over the tool holder and the hob arm for this purpose.

The tool holder can possibly be traveled relative to the workpiece holder by traveling the hob arm. On the machining of workpieces having outer gearings in accordance with the second aspect, the tool holder has to be traveled together with the chamfer hob around the workpiece after the chamfering of an edge region on one side. This can take place by a travel in the axial direction of the workpiece holder with a one-sided clamping of the workpiece and by a travel of the tool holder in a plane perpendicular to the axis of rotation of the workpiece holder.

The apparatus in accordance with the second aspect is, however, possibly used for chamfering internal gearings. A traveling of the tool holder together with the chamfer hob from the first engagement position to the second engagement position is particularly simple here since the chamfer hob only has to be traveled in the radial and axial directions through the center opening of the gearing for this purpose. This can possibly be done by a traveling of the tool holder together with the chamfer hob in the radial direction toward the axis of rotation of the workpiece holder and, with an additional, optionally superposed, movement of the tool holder together with the chamfer hob in the direction of the axis of rotation of the tool holder.

The apparatus in accordance with the first and second aspects of the disclosure may be implemented independently of one another. However, both aspects are possibly implemented together in a single apparatus. An apparatus in accordance with the second aspect can therefore possibly have an internal hob arm for machining internal gearings in accordance with the first aspect.

The apparatus in accordance with the disclosure are typically used in high volume production and possibly in mass production. The machining of the workpieces and thus also the chamfering process in this case take place in an automated manner by the control of the apparatus.

The apparatus in accordance with the disclosure therefore may have a control for an automatic control of the machine axes of the apparatus for chamfering the edge of the gearing on at least one front side and possibly on both front sides of a workpiece.

The control of the apparatus is possibly programmed such that the apparatus in accordance with the disclosure may automatically carry out the steps described above with respect to their operation and/or use. The control possibly has a microprocessor and a memory in which a control program for controlling the apparatus is stored which is worked through by the microprocessor.

The present disclosure includes the apparatus described in more detail above that is suitable for holding a chamfer hob and possibly a chamfer cut hob in the tool holder and for carrying out the above-described applications.

The present disclosure, however, likewise comprises an apparatus such as has been described above in which at least one chamfer hob is held in the tool holder or in which with a plurality of tool holders respective chamfer hobs are held therein. Chamfer cut hobs are possibly held in the tool holder or tool holders.

The present disclosure further relates to a gear manufacturing machining center having an apparatus such as was described above, a gear cutting machine, and a workpiece changer. The gear cutting machine is possibly a machine for machining internal gearings, possibly a milling machine and/or a chamfer cut deburring device or a skiving machine.

The gear manufacturing machining and the chamfering of the workpieces possibly take place in the gear manufacturing machining center. Workpieces gear manufactured by the gear manufacturing machine are possibly transported via the workpiece changer to the apparatus for chamfering in accordance with the present disclosure to be chamfered, while the next workpiece is already being gear manufactured on the gear manufacturing machine. A chamfering of the workpiece is also conceivable between a rough machining step and a fine machining step for which purpose the workpiece is possibly traveled from the gear manufacturing machine to the apparatus in accordance with the disclosure and back again.

The workpiece changer is possibly a ring automation, with further possibly the apparatus for chamfering in accordance with the disclosure and the gear manufacturing machine being arranged at different angular positions of the ring automation.

The gear manufacturing machine and the apparatus in accordance with the disclosure possibly have separate workpiece holders. The workpiece changer in this case changes a workpiece after the gear manufacturing machining of the gear manufacturing machine from the workpiece holder there to the workpiece holder of the apparatus for chamfering in accordance with the disclosure.

In an alternative embodiment, the gear manufacturing machining center can, however, also have a plurality of workpiece holders in which the workpieces remain for the gear manufacturing machining and the chamfer machining. In this case, the workpiece holders are possibly moved from the gear manufacturing machine to the apparatus in accordance with the disclosure and/or vice versa.

The workpiece changer is possibly used to place workpieces from an external transport path or from other machining stations onto the workpiece holder or workpiece holders and to remove them therefrom.

In accordance with a further aspect of the present disclosure, the apparatus in accordance with the disclosure can also be designed as a separate machine. It possibly receives toothed workpieces from a transport path and/or from an automation to chamfer machine them. The correspondingly machined workpieces are then possibly again transferred to a transport path and/or automation again.

The present disclosure further comprises in accordance with the first aspect a method of chamfering at least one front-side edge of the gearing of a workpiece having internal gearing by a chamfer hob, possibly a chamfer cut hob, held in a rotatably supported tool holder. Provision is made in accordance with the disclosure that the tool holder is arranged at an internal hob arm whose free end is traveled at least partly for chamfer machining into the center opening formed by the gear machining of the workpiece. The tool holder is possibly traveled through the center opening of the workpiece by traveling the internal hob arm to bring the chamfer hob into engagement with an edge of the gearing on the lower side of the workpiece.

The method in accordance with the disclosure possibly takes place as has already been described in more detail above with respect to the first aspect of the present disclosure. The method in accordance with the disclosure can possibly be carried out by an apparatus such as has been described above with respect to the first aspect.

The present disclosure further comprises in accordance with the second aspect a method of chamfering at least one front-side edge of the gearing of a toothed workpiece by a chamfer hob, possibly a chamfer cut hob, held in a tool holder, wherein as part of the method in accordance with the disclosure a chamfering of the edges of the gearing takes place with the same chamfer hob on both front sides of the workpiece in that a chamfer hob held in the tool holder is brought into engagement with an edge region of a first side of the workpiece in a direction that is the first radial direction with respect to the axis of the workpiece and is brought into engagement with a radially oppositely disposed edge region of the second side of the workpiece by traveling the tool holder relative to the workpiece in a direction that is the second radial direction with respect to the axial direction of the workpiece.

The method possibly takes place such as was presented in more detail above with respect to the apparatus in accordance with the second aspect of the present disclosure. The method in accordance with the disclosure possibly takes place using an apparatus in accordance with the second aspect. The method in accordance with the disclosure in accordance with the second aspect can also be used both for the chamfering of external gearings and for the chamfering of internal gearings.

The methods in accordance with the first and second aspects are possibly combined with one another. The methods and apparatus in accordance with the disclosure are possibly used for chamfering the edges of spur gearings.

The workpieces in accordance with the disclosure are possibly gears, possibly gears having at least one internal gearing. Such gears having an internal gearing possibly have an annular shape, with the internal gearing being arranged at the inner annular surface.

The chamfering possibly takes place in accordance with the present disclosure via a chamfer cut hob. The chamfer cut hob can possibly be designed like the deburring tool that is described in DE 10330474 A1. The chamfering further possibly takes place by means of the chamfer cut hob such as is likewise described in DE 10330474 A1 for the deburring process.

Unlike as shown in DE 10330474 A1, the chamfer cut hob is possibly not clamped on the same tool arbor as part of the current disclosure with the tool that is used to manufacture the gearing, but rather in a separate tool holder, potentially as the only tool in a separate tool holder.

The present disclosure will now be described in more detail with reference to drawings and to embodiments.

DETAILED DESCRIPTION

Figure 1:
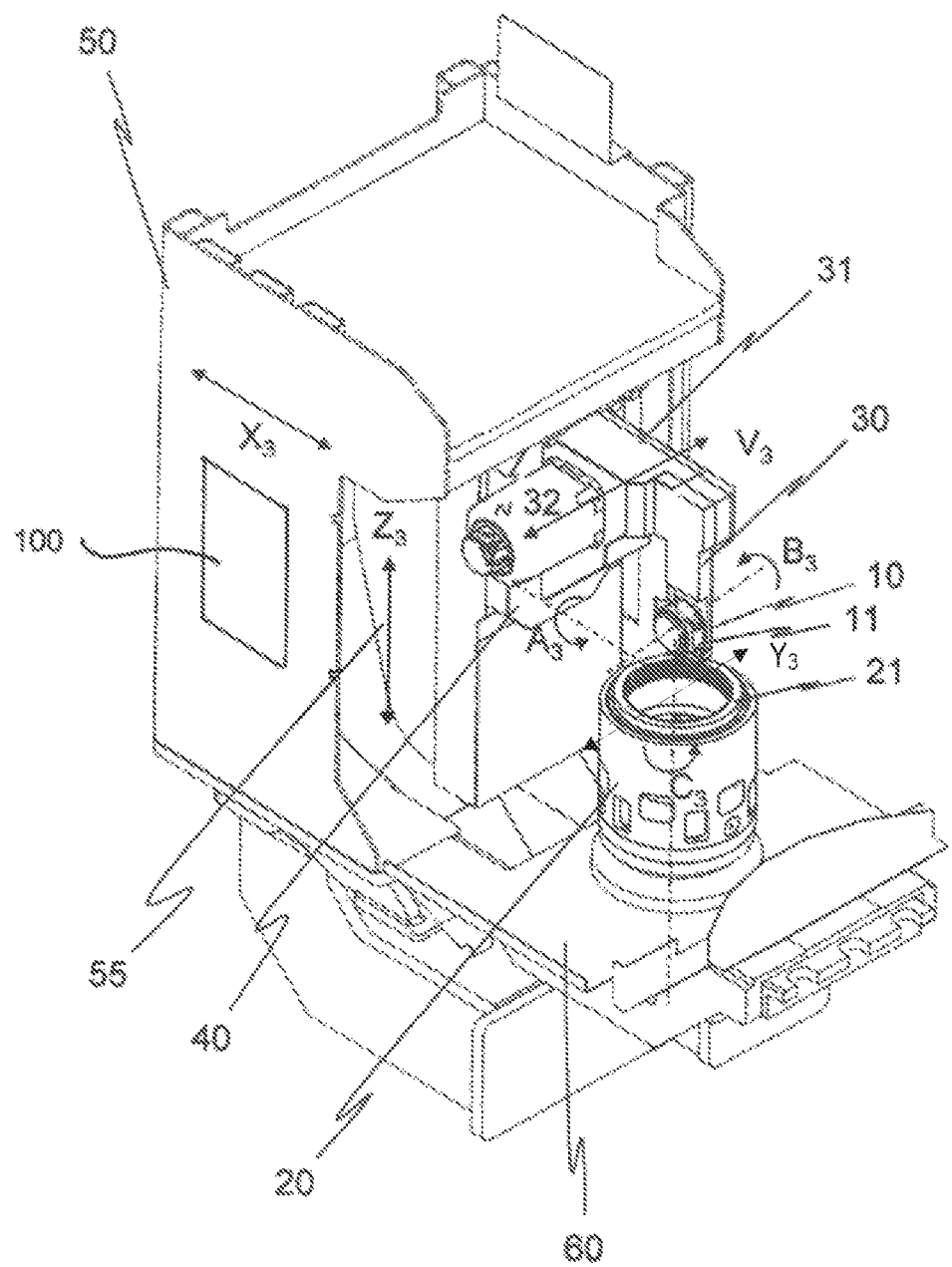
FIG. 1: a first embodiment of an apparatus for chamfering in accordance with the disclosure in a perspective view.
Figure 2:
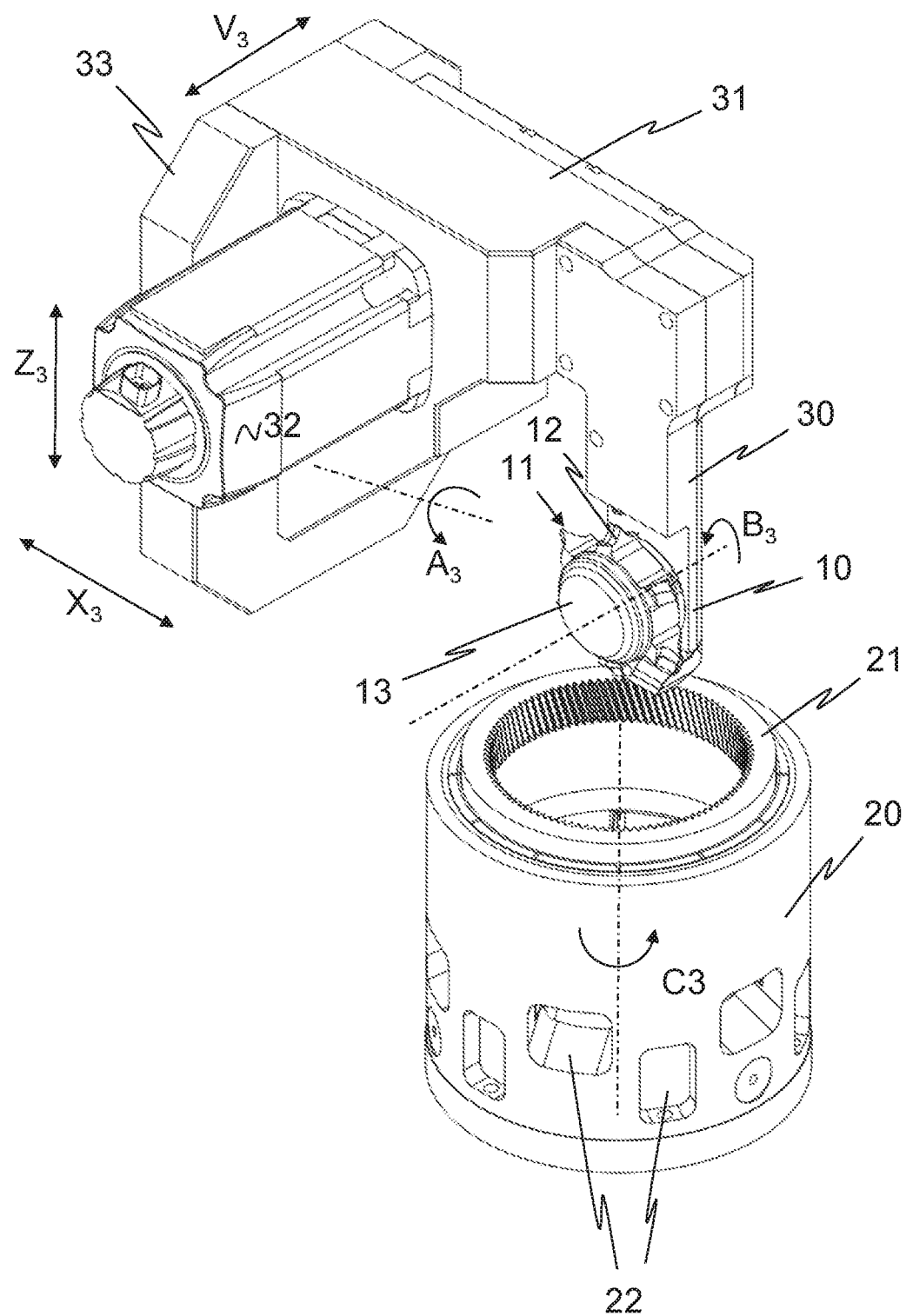
FIG. 2: the internal hob arm and the tool holder of the apparatus shown in FIG. 1 in a perspective representation.

The embodiments of the apparatus in accordance with the disclosure described with reference to the Figures in the following each have a rotatably supported workpiece holder 20 for holding a workpiece 21 having internal gearing and a rotatably supported tool holder 10 for holding a chamfer hob 11. The apparatus includes a controller 100 schematically shown in FIG. 1 for controlling the machine axes of the apparatus.

The workpiece holder 20 and the tool holder 10 can each be set into rotation via a drive about their respective axes of rotation C3 and B3. The apparatus has a control via which the rotational movement of the workpiece holder 20 and the rotational movement of the tool holder 10 can be controlled and can possibly be synchronized with one another.

The tool holder 10 is arranged at an internal hob arm 30 in accordance with the first aspect of the present disclosure. The internal hob arm 30 can be at least partly traveled via machine axes of the apparatus into the center opening formed by the internal gearing of a workpiece 21 held in the workpiece holder 20.

In the embodiment, the internal hob arm 30 is arranged at a machining head 40 that is arranged next to the workpiece holder 20 and that is travelable via a plurality of machine axes.

The machining head 40 is possibly pivotable about a pivot axis A3 that extends perpendicular to the axes of rotation B3 and C3 of the tool holder 10 and of the workpiece holder 20. The machining head 40 is furthermore travelable via a linear axis Z3 in a direction in parallel with the axis of rotation C3 of the workpiece holder. The machining head 40 can for this purpose possibly be arranged via a slide within a frame 50 for this purpose. The machining head 40 can furthermore be traveled via a linear axis X3 (within the frame 50)) in a direction perpendicular to the axes of rotation B3 and C3 of the tool holder 10 and of the workpiece holder 20. In the embodiment, the machine column 55 can for this purpose be traveled via a slide with respect to the console on which the workpiece holder 20 is arranged at the machine bed.

In the embodiment, a shift axis V3 is further provided via which the machining head can be traveled in the direction of the axis of rotation B3 of the tool holder. Alternatively or additionally, a Y3 axis could also be provided via which the machining head can be traveled in a direction perpendicular to the X3 axis and to the Y3 axis.

The traveling of the internal hob arm into the center opening takes place via the Z3 axis in the embodiment. The further machine axes are used to set the position of the internal hob arm and/or chamfer hob relative to the internal gearing.

Other mechanical embodiments of the machine axes for traveling the machining head are also conceivable. For example, one or more of the above-named machine axes could be dispensed with, for example the V3 axis and/or the A3 axis.

The machining head could furthermore be arranged suspended above the workpiece holder 20 instead of next to the workpiece holder at a machine column as in the embodiment. The arrangement of the machining head at the machine column has construction advantages, however.

In the embodiment, the internal hob arm 30 is arranged above a mount 31 at the machining head 40. The mount 31 has an installation plate 33 that possibly extends in parallel with a plane defined by the axes of rotation B3 and C4 and via which the mount 31 can be fastened to the machining head. The fastening possibly takes place such that the pivot axis A3 intersects the axis of rotation B3 of the tool holder 10.

The mount 31 extends from the front side of the machining head 40 facing the workpiece in a direction perpendicular to the axes of rotation B3 and C3. The internal hob arm 30 extends, starting from a connection region to the mount 31, in a direction perpendicular to the axis of rotation B3 of the tool holder. The internal hob arm extends through the arrangement of the mount 31 spaced apart from the front side of the machining head 40 facing the workpiece. In the embodiment, the main axis of the internal hob arm extends in parallel with the front side of the machining head 40 facing the workpiece and/or in parallel with a plane defined by the axes of rotation B3 and C4.

The internal hob arm is adapted so that it can dip into the center opening of the workpiece 21 with a corresponding pivot position of the pivot axis A3. The main axis of the internal hob arm for this purpose possibly extends perpendicular to the axis of rotation B3 of the tool holder and can further possibly be arranged by pivoting about the pivot axis A3 such that the tool held in the tool holder is arranged corresponding to its lead angle with respect to the workpiece.

The internal hob arm 30 has a hook-shaped design together with the mount 31 so that, on the dipping of the internal hob arm into the center opening, a part of the workpiece is arranged between the internal hob arm and the machining head. This part or the oppositely disposed part of the gearing is possibly machined by the chamfer hob.

In the embodiment, the drive 32 for the tool holder 10 is not arranged at the internal hob arm 30, but rather at the mount 31. The internal hob arm 30 can hereby be designed as narrow and can thus also dip into workpieces having small internal diameters.

A drivetrain extends in the internal hob arm 30 and in the mount 31 for driving the tool holder 10. A belt drive 120 schematically shown in FIG. 6 in solid lines is possibly provided for this purpose. It possibly extends from a drive-side belt pulley to a belt pulley pair which is arranged in the connection region between the internal hob arm 30 and the mount 31 and from which a further belt drive extends through the internal hob arm 30 to a belt pulley arranged on the axis of rotation of the tool holder 10. Alternatively, the drivetrain could also comprise gears and/or shafts 120 schematically shown in FIG. 6 in dashed lines.

A sensor 60 is furthermore provided at the hob arm 30 for threading and/or meshing the chamfer hob 11 into the internal gearing. The sensor 60 can possibly be a contactless sensor, for example an inductive sensor and/or an optical sensor. It is positioned with its effective surface 61 next to the gearing of the workpiece 21 by traveling the internal hob arm into the center opening of the workpiece. The gearing is thereupon moved past the sensor by rotating the workpiece holder 20, with the sensor detecting the position of the teeth of the internal gearing.

Figure 3:
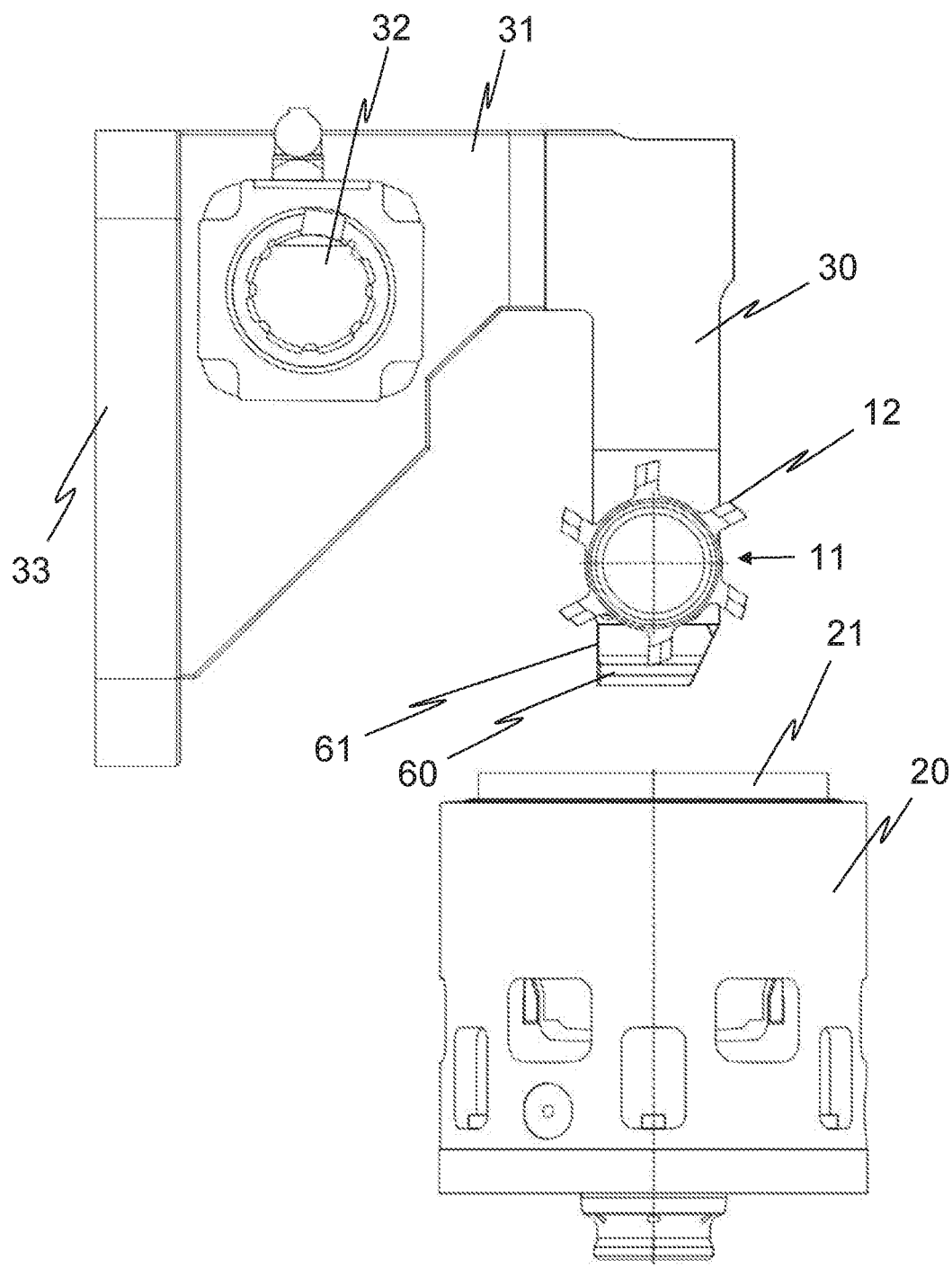
FIG. 3: the internal hob arm and the workpiece holder in a side view, with the internal hob arm not yet having dipped into the center opening of the workpiece to be machined.
Figure 13:
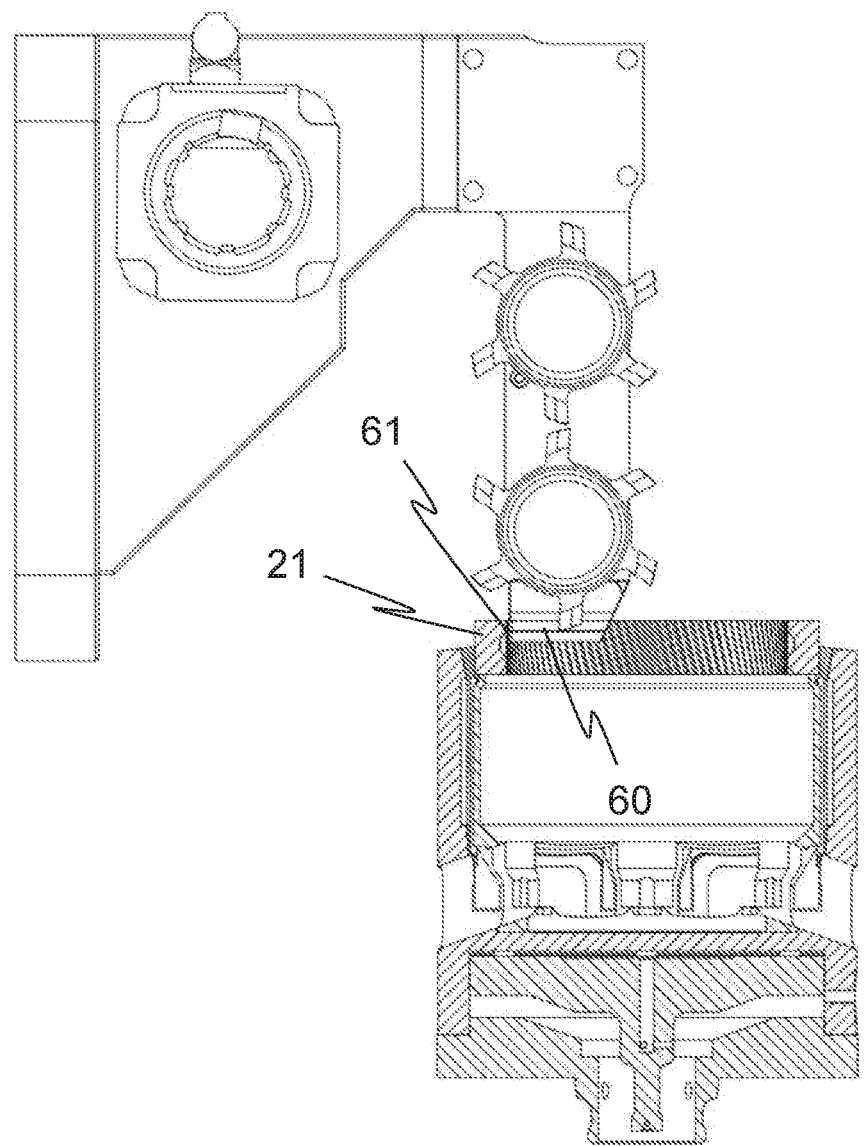
FIG. 13: the embodiment shown in FIG. 12 in a side view in a position in which a sensor for meshing and/or threading into the center opening of the gearing was traveled.

In the embodiment, the sensor 60 is arranged at the free end of the internal hob arm 30 below the tool holder 10. As shown in FIGS. 3 and 13, the free end of the internal hob arm 30 therefore dips into the center opening formed by the internal gearing of the workpiece 21 so that the effective side 61 of the sensor 60 is located next to the internal gearing. The sensor is arranged so far below the tool holder 10 that a chamfer hob 11 held in the tool holder 10 cannot come into contact with the gearing in the measurement position of the hob arm and therefore does not form any interference edge.

The apparatus in accordance with the disclosure furthermore permits the tool holder 10 for the chamfer hob 11 to be traveled through the center opening of the workpiece 21 by means of the internal chamfer hob to use the chamfer hob for chamfering the edge 27 of the gearing on the lower side of the workpiece 21.

The internal hob arm 30 has a correspondingly elongated and narrow shape for this purpose, said shape permitted a traveling through the center opening.

The workpiece holder 20 is furthermore, as shown in section in FIGS. 4 and 5, designed in cup form and hereby provides sufficient space below the center opening of the workpiece 21 to hold the free end of the internal hob arm 30 and of the chamfer hob 11.

The workpiece holder in the embodiment has a support edge 23 on which an outer region of the lower side of the workpiece lies into which the gearing does not reach. Clamping jaws 24 are furthermore provided which engage at the outer periphery of the workpiece and which can possibly be clamped via a central clamping means 25.

A cup-shaped recess 26 which can receive the internal hob arm and the chamfer hob extends below the support edge 23. A corresponding depth of the recess is required for this purpose, on the one hand. The side walls 28 of the cup-shaped recess 26 are furthermore set sufficiently far outwardly in the radial direction so that the teeth 12 of the chamfer hob 11 are located beneath the region of the workpiece 21 without teeth. The side walls can be set back with respect to the support edge 23 for this purpose. Alternatively or additionally, the support edge 23 can be selected as so narrow that the complete region of the workpiece without teeth does not lie on the support edge 23.

Figure 5:
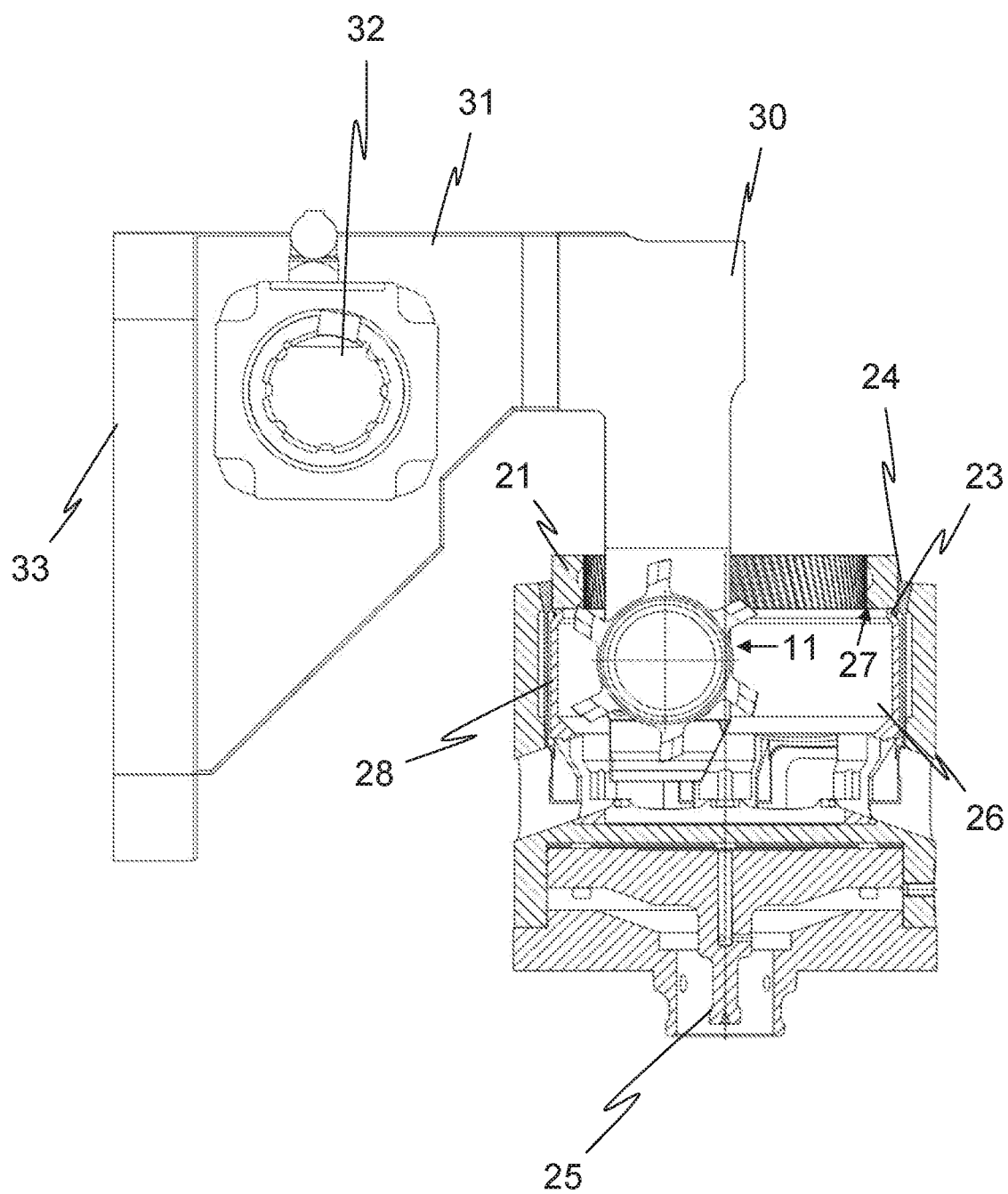
FIG. 5: a side view in which the tool holder arranged at the internal hob arm has been traveled through the center bore to the lower side of the workpiece to machine an edge of the gearing on the lower side of the workpiece with the chamfer hob.

In the machining position shown in FIG. 5 in which the edge 27 of the gearing is machined on the lower side of the workpiece, the angle between the axis of rotation C3 of the tool holder and a straight line that extends starting from the axis of rotation B3 of the tool holder to the edge 27 to be machined on the lower side, possibly between 30° and 60°, further possibly between 45° and 60°. A corresponding angle of the chamfer at the workpiece is hereby reached. The tool holder accordingly has to be arranged below the edge to be machined for which purpose the design of the recess 26 provides the required space.

The internal hob arm 30 is designed as so narrow in the region of the tool holder that the teeth 12 of the chamfer hob 11 look out over the interference edge formed by the internal hob arm 30 at least one side and can thus be brought into engagement with the edge of the internal gearing. The chamfer hob 11 can possibly be brought into engagement with the internal gearing at least on the side directed toward the machining head.

In the embodiment shown, the internal hob arm 30 is, however, designed such that the chamfer hob can be brought into engagement with the internal gearing on two sides. The teeth 12 of the chamfer hob 11 also project beyond the internal hob arm 30 on the side remote from the machining head. The following advantages described in more detail in the following hereby result.

Figure 4:
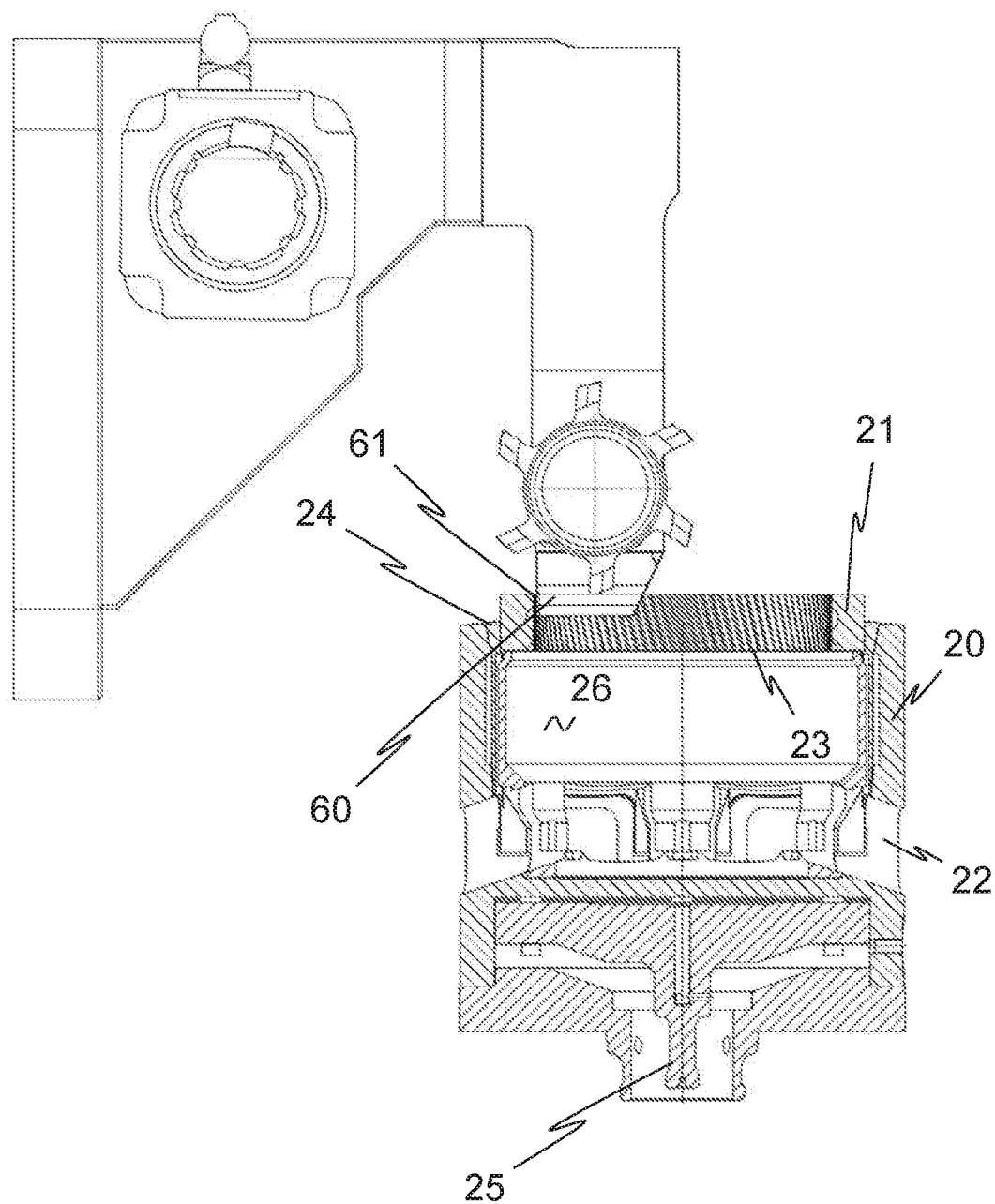
FIG. 4: a side view in which a sensor arranged at the internal hob arm for meshing and/or threading in the region of the internal gearing, for which purpose the internal hob arm partly dips into the internal gearing.

The machining of the edges of the gearing takes place such that a measurement of the gearing first takes place via the sensor 60 after the loading of the workpiece having internal gearing to be able to thread or mesh the chamfer hob into the gearing, see FIGS. 4 and 13. However, this can optionally be dispensed with if the position of the gearing is already known, for example because the workpiece was previously gear manufacturing machined in the same clamping.

The chamfering of the edge of the gearing on the lower side of the workpiece takes place in each case in that the free end of the internal hob arm is traveled through the center opening of the workpiece into the workpiece holder so that the tool holder for the chamfer hob is located below the edge and the chamfer hob can therefore be brought into engagement with the edge obliquely from below, see FIGS. 5, 8, 10, and 14.

In the embodiments shown, the chamfer hob is brought into engagement with the edge of the gearing on the lower side of the workpiece on its side facing the machining head. This is, however, not compulsory. For example, the chamfer hob could also be brought into engagement with the edge of the gearing on the lower side of the workpiece at its side remote from the machining head.

The machining of the edge of the gearing on the upper side of the workpiece takes place in that a chamfer hob arranged in a workpiece holder of the internal hob arm is brought into engagement with this edge obliquely from above. For this purpose, the chamfer hob is traveled into the region of the center opening of the workpiece by traveling the chamfer arm so that the teeth of the chamfer hob dip into the center opening. The free end of the internal hob arm also dips into the center opening for this purpose in the embodiments, see FIGS. 6, 9, 11, and 15.

Depending on the embodiment, the chamfer hob is brought into engagement with the edge of the gearing on the upper side of the workpiece on its side facing the machining head or on its side remote from the machining head.

The machining of the edge of the gearing on the lower side of the workpiece can take place before or after the machining of the edge of the gearing on the upper side of the workpiece.

In accordance with a second aspect of the present disclosure that can also be used independently of the chamfer machining of internal gearings such as has previously been described, the present disclosure permits the chamfering of the edges on both front sides of the workpiece with the same chamfer hob. This second aspect will be presented in the following with reference to the embodiment which is shown in FIGS. 1 to 6 and which also implements the first aspect of the present disclosure. It is, however, independent of this first aspect.

In accordance with the second aspect, the chamfer hob 11 is traveled after the machining of a first edge of the gearing on a first side of the workpiece 21, after the machining of the edge of the lower side in the embodiment in FIGS. 1 to 6, to a second edge region of the gearing on the other side of the workpiece 21 disposed opposite with respect to the axis of rotation C3 of the workpiece holder 20. It is the edge 29 of the gearing on the upper side of the workpiece 21 in FIG. 6. This second edge is then machined with the same direction of rotation of the tool as the first edge. The machining of the edge, however, takes place with the same cutting direction between the chamfer hob and the workpiece due to the reversed radial position relative to the workpiece 21, with the direction of rotation of the workpiece having to be reversed. In the embodiment, the cutting movement takes place from the front side of the workpiece into the gearing, and indeed both on the machining of the edge 27 on the lower side and on the machining of the edge 29 on the upper side. In an alternative embodiment, the machining of the edges 27 and 29 could also each take place from the gearing in the direction of the respective front side.

If the second aspect is used to chamfer an internal gearing and also implements the first aspect of the present disclosure, the chamfer hob 11 is therefore traveled between the machining steps with which the first edge 27 and the second edge 29 are machined both in the direction of the axis of rotation C3 of the workpiece holder through the center opening of the workpiece 21 and is traveled radially to the axis of rotation C3 of the workpiece holder through the center of the center opening to bring the chamfer hob 11 into engagement with, on the one hand, the edge 27 on the lower side in a first radial position and, on the other hand, with the edge 29 on the upper side in a radially oppositely disposed position. The traveling of the tool holder or of the internal hob arm possibly takes place via the axes Z3 and X3 of the machining head.

In the embodiment, the two radial positions are disposed opposite in a direction that stands perpendicular on the axis of rotation B3 of the tool holder, i.e. the chamfer hob is brought into engagement with the edges on its side facing or remote from the machining head.

Figure 6:
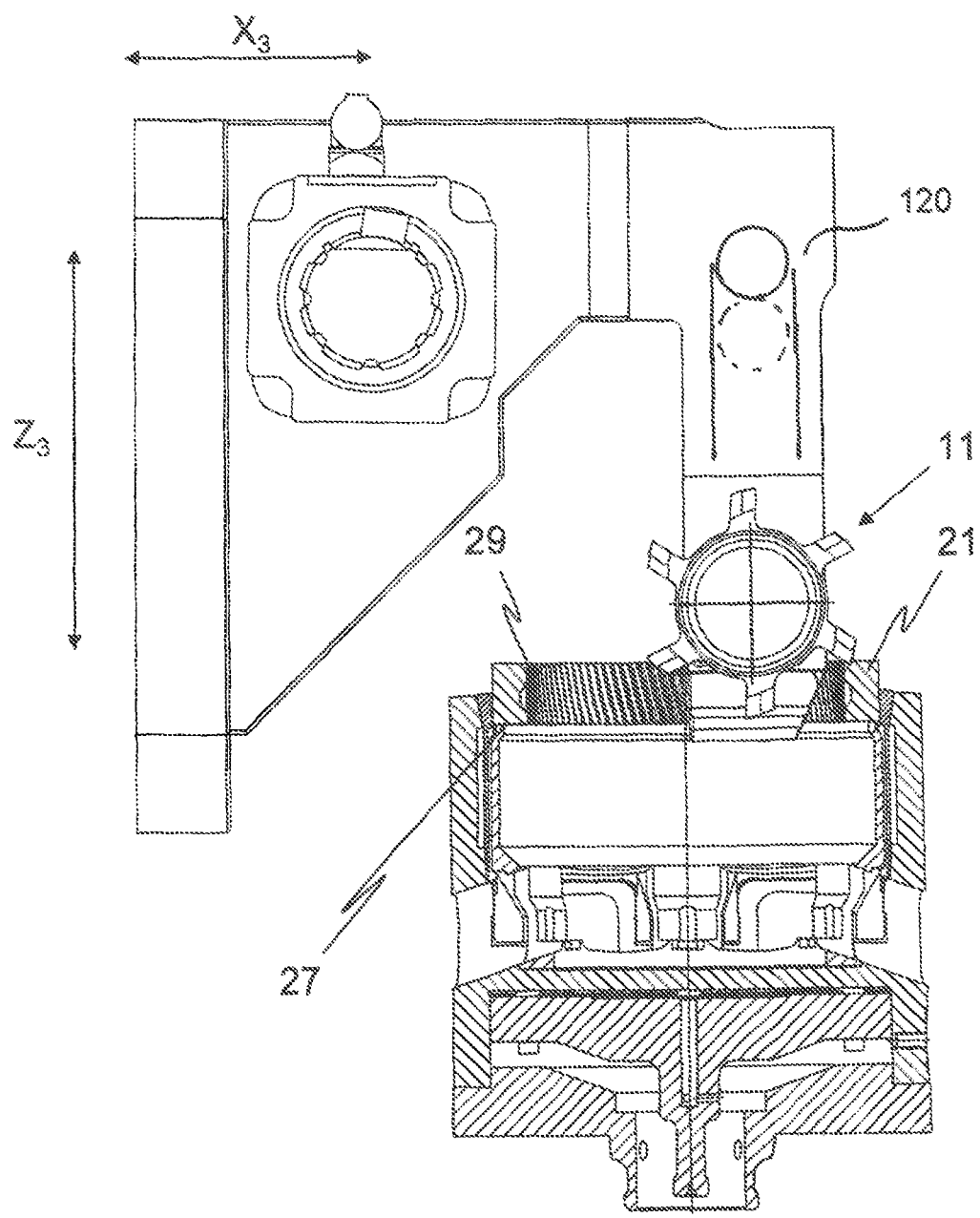
FIG. 6: a side view in which the internal hob arm has been traveled in a direction that is the radial direction with respect to the axis of rotation of the workpiece holder through the center of the toothed workpiece to machine an edge of the gearing on the upper side of the workpiece.
Figure 7:
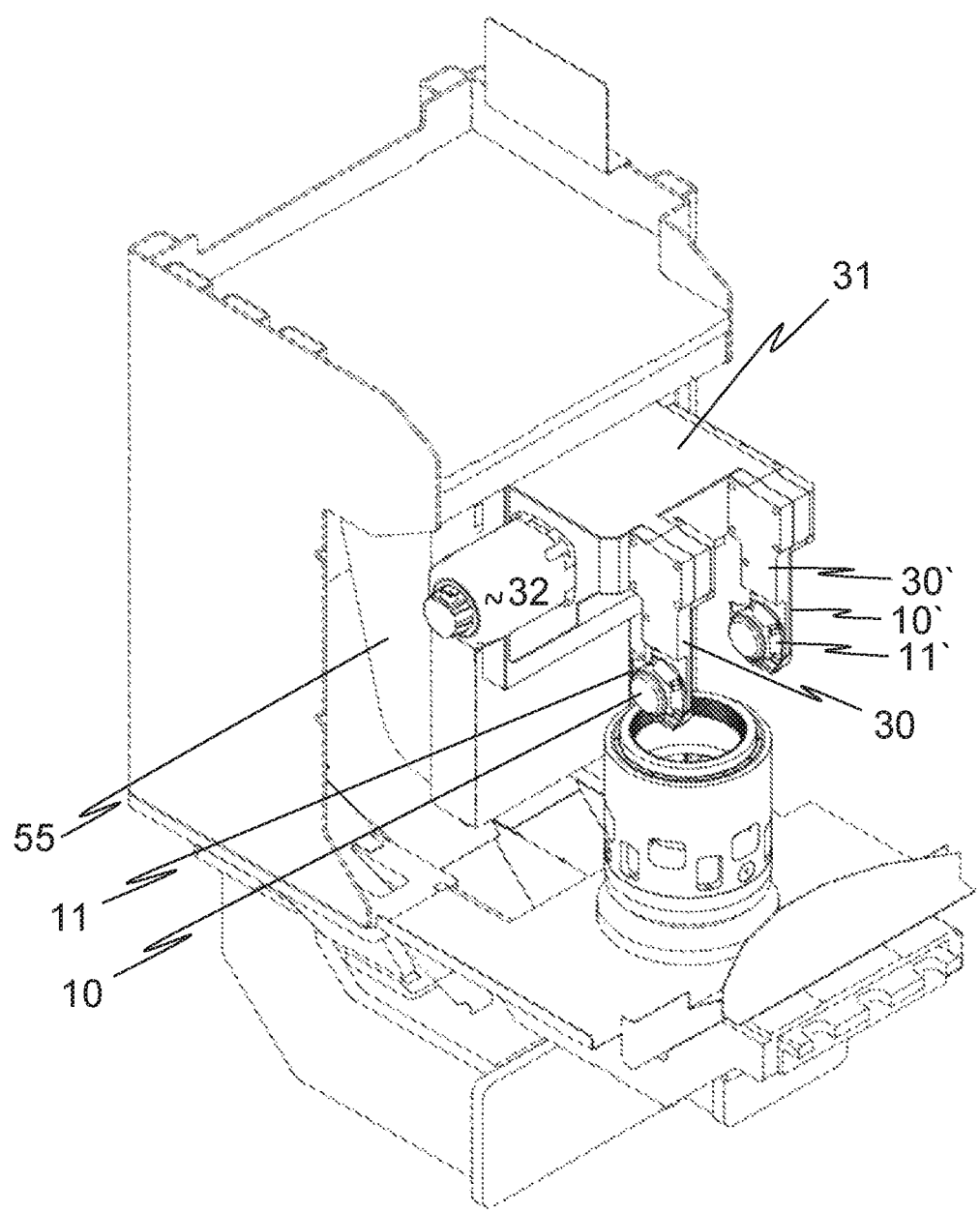
FIG. 7: a second embodiment of an apparatus in accordance with the disclosure having two separate internal hob arms.

As can be seen from FIG. 6, the internal hob arm 30 is designed such that the teeth 12 of the chamfer hob 11 can be brought into engagement with the internal gearing of the workpiece 21 on two sides.

The second aspect of the present disclosure which enables a chamfering of the edges on both front sides of the workpiece with the same chamfer hob and with the same cutting direction relative to the workpiece is, however, not restricted to internal gearings. The same principle can rather also be used in the machining of external gearings.

The tool, i.e. the chamfer hob 11, is able to be brought into engagement with the gearing on two oppositely disposed sides for this purpose. The tool holder can, for example, likewise be arranged at a hob arm for this purpose. Alternatively or additionally, the chamfer hob can be arranged on a long tool arbor.

Unlike embodiments including machining of an internal gearing, this embodiment of a chamfer hob cannot be traveled through the center of the workpiece, but travels around it. This can take place by traveling the tool in the direction of the axis of rotation of the workpiece if the latter is only clamped on one side and/or in the peripheral direction around the workpiece.

In the first embodiment of the present disclosure which is shown in FIGS. 1 to 6 and which implements both the first aspect and the second aspect of the present disclosure, only an internal hob arm having a tool holder is provided.

Since the tool held in the tool holder can be used for machining the edges on the upper side and on the lower side in accordance with the second aspect, further tool holder or internal hob arms are not required for a plurality of application cases.

The present disclosure, however, covers further designs that have a plurality of internal hob arms and/or tool holders and that will be shown in more detail in the following.

The embodiment shown in FIGS. 7 to 11 shows an embodiment having two separate internal hob arms 30 and 30'. They are arranged at a common mount 31. The design and the use of the internal hob arms 30 and 30' correspond to the first embodiment in FIGS. 1 to 6 so that reference is made to the description there. The same applies to the other components of the apparatus.

The two internal hob arms 30 and 30' are arranged spaced apart at the mount 31. The arrangement takes place in the embodiment such that the axes of rotation of the two tool holders 10 and 10' of the two internal hob arms 30 and 30' extend in parallel and are possibly aligned with one another.

In the embodiment, a common drive 32 is provided for the tool holders 10 and 10' of the two internal hob arms. Separate drives would also be alternatively conceivable. It would furthermore likewise be conceivable to provide respective separate mounts 31 for the two internal hob arms and to only arrange them next to one another at the machining head 40.

The first application case for the embodiment with two internal hob arms comprises the machining of different workpieces without an intermediate tool change. A chamfer hob 11 for machining a first workpiece can possibly be arranged at the first internal hob arm 30; a second chamfer hob 11' for machining a second workpiece with a different gearing geometry can be arranged at the second internal hob arm 30'. The first internal hob arm can then be used for machining the first workpiece, the other internal hob arm can be used for machining the other workpiece. The respective internal hob arm only has to be brought into engagement with the workpiece for this purpose by traveling the V3 axis.

Figure 8:
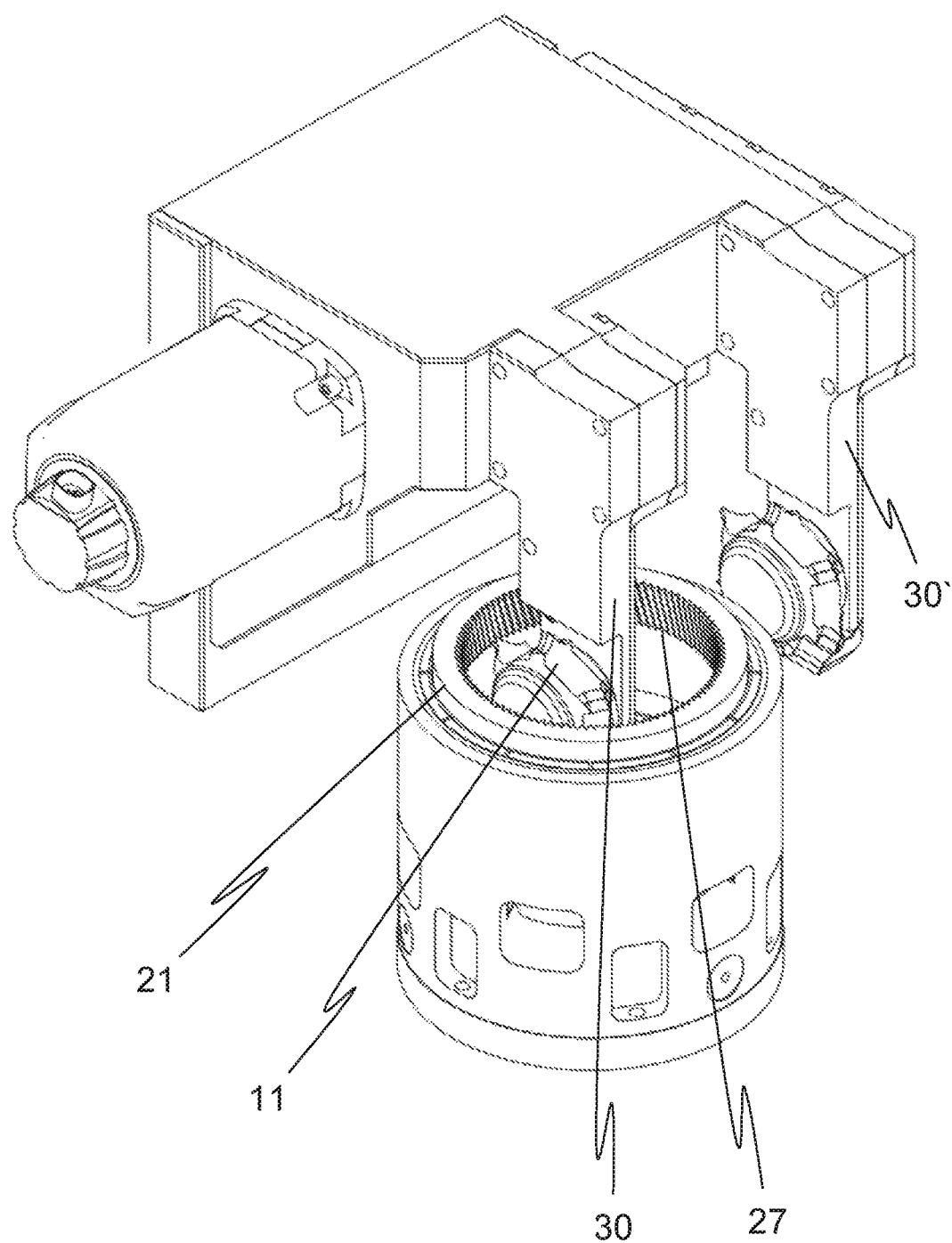
FIG. 8: a perspective view in which the chamfer hob held at the first internal hob arm for chamfering an edge of the gearing on the lower side of a first workpiece is used.
Figure 9:
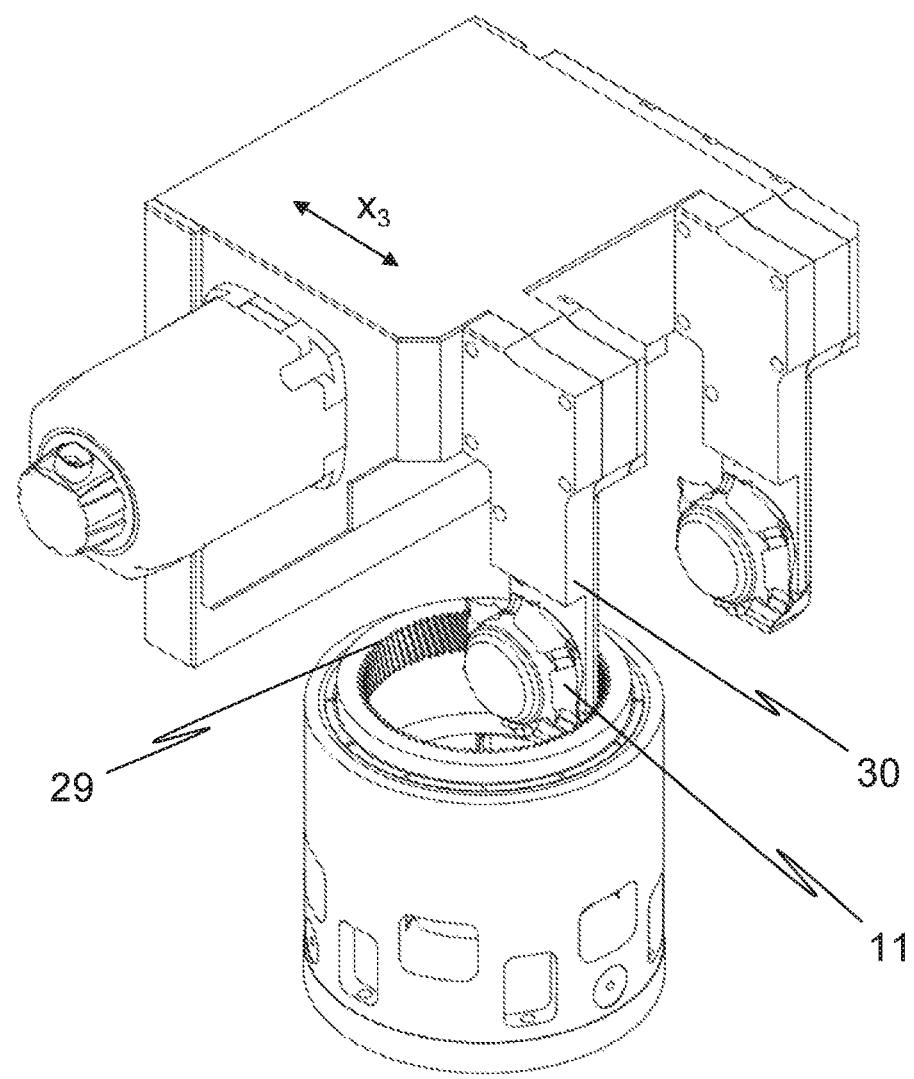
FIG. 9: a perspective view in which the chamfer hob held at the first internal hob arm for machining an edge of the gearing on the upper side of the first workpiece is used in that the internal hob arm has been traveled in a direction that is the radial direction with respect to the axis of rotation of the workpiece holder to the oppositely disposed side.
Figure 10:
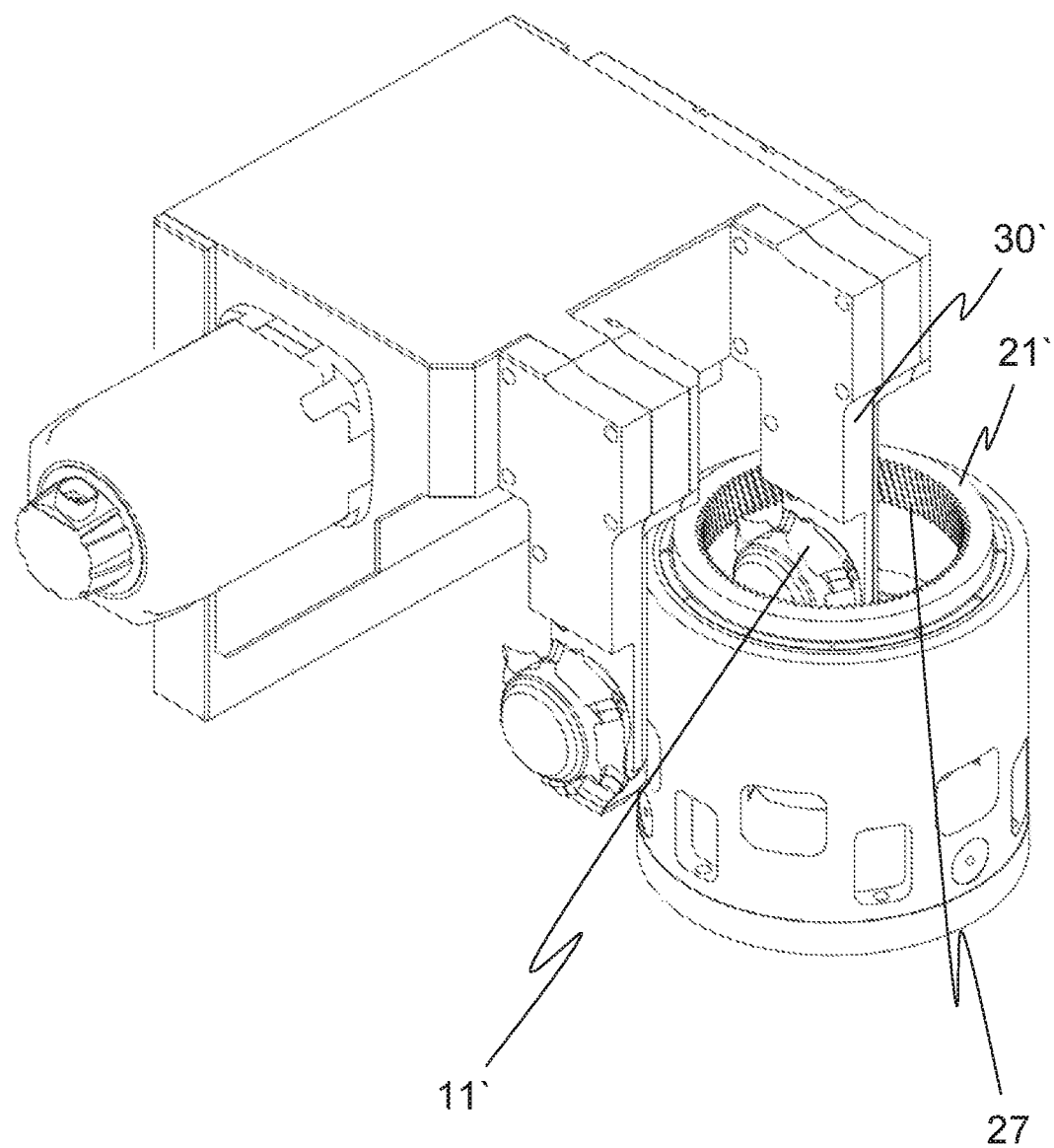
FIG. 10: a perspective view in which the chamfer hob held at the second internal hob arm for chamfering an edge of the gearing on the lower side of a second workpiece is used.

The machining of the edges on the lower side and upper side of the respective workpieces can in this case take place in accordance with the second aspect of the present disclosure, as was already described in more detail above with respect to the embodiment in FIGS. 1 to 6. This is shown in FIGS. 8 to 10. FIG. 8 shows the machining of the lower edge of a first workpiece 21 via the first chamfer hob 11 held at the first internal hob arm 30 and FIG. 9 shows the machining of the upper edge 29 of the first workpiece 21 via the same internal hob arm 30 and chamfer hob 11, with the latter traveling radially through the center of the center opening for this purpose.

Figure 11:
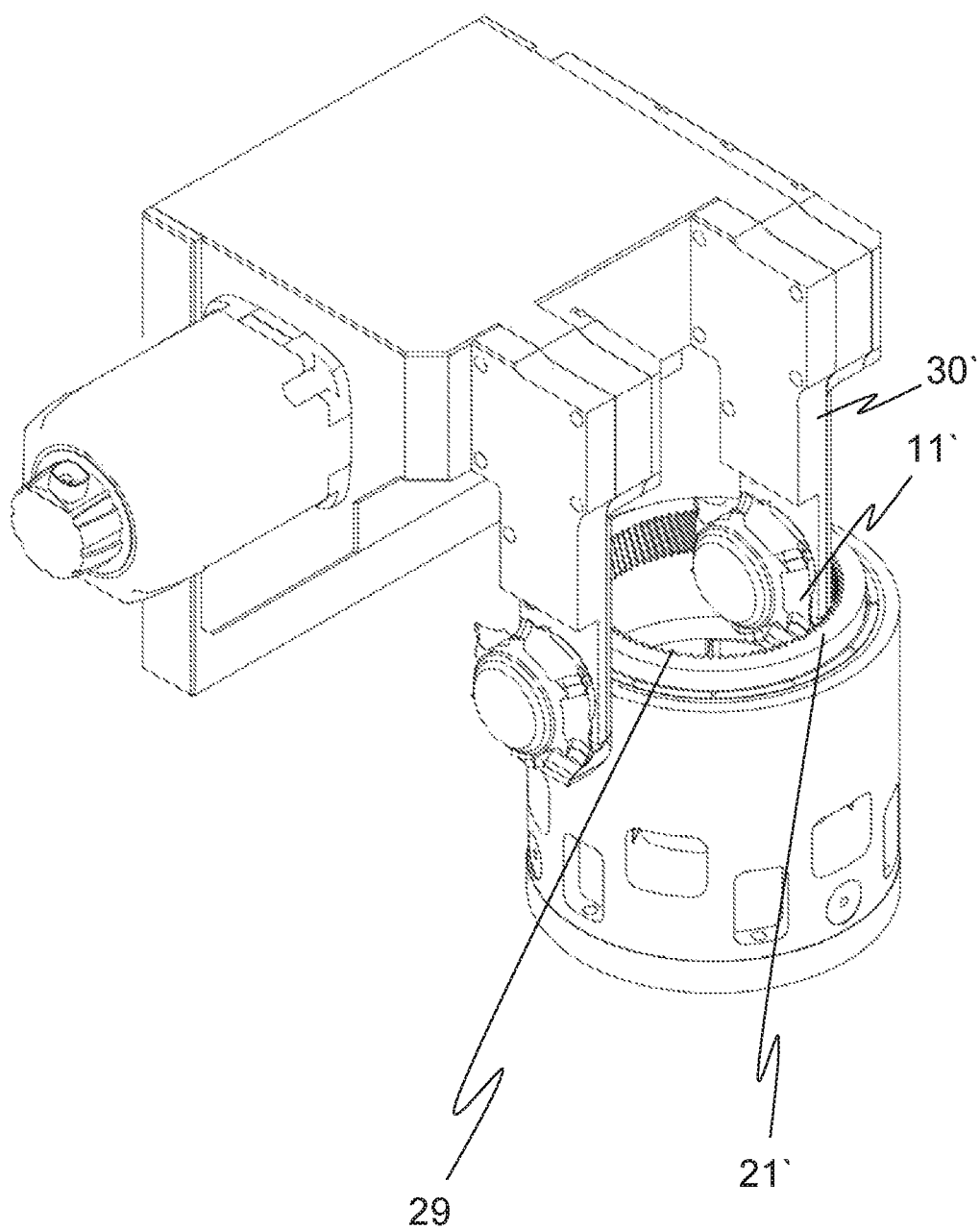
FIG. 11: a perspective view in which the chamfer hob held at the second internal hob arm for machining an edge of the gearing on the upper side of the second workpiece is used in that the internal hob arm has been traveled in a direction that is the radial direction with respect to the axis of rotation of the workpiece holder to the oppositely disposed side.
Figure 12:
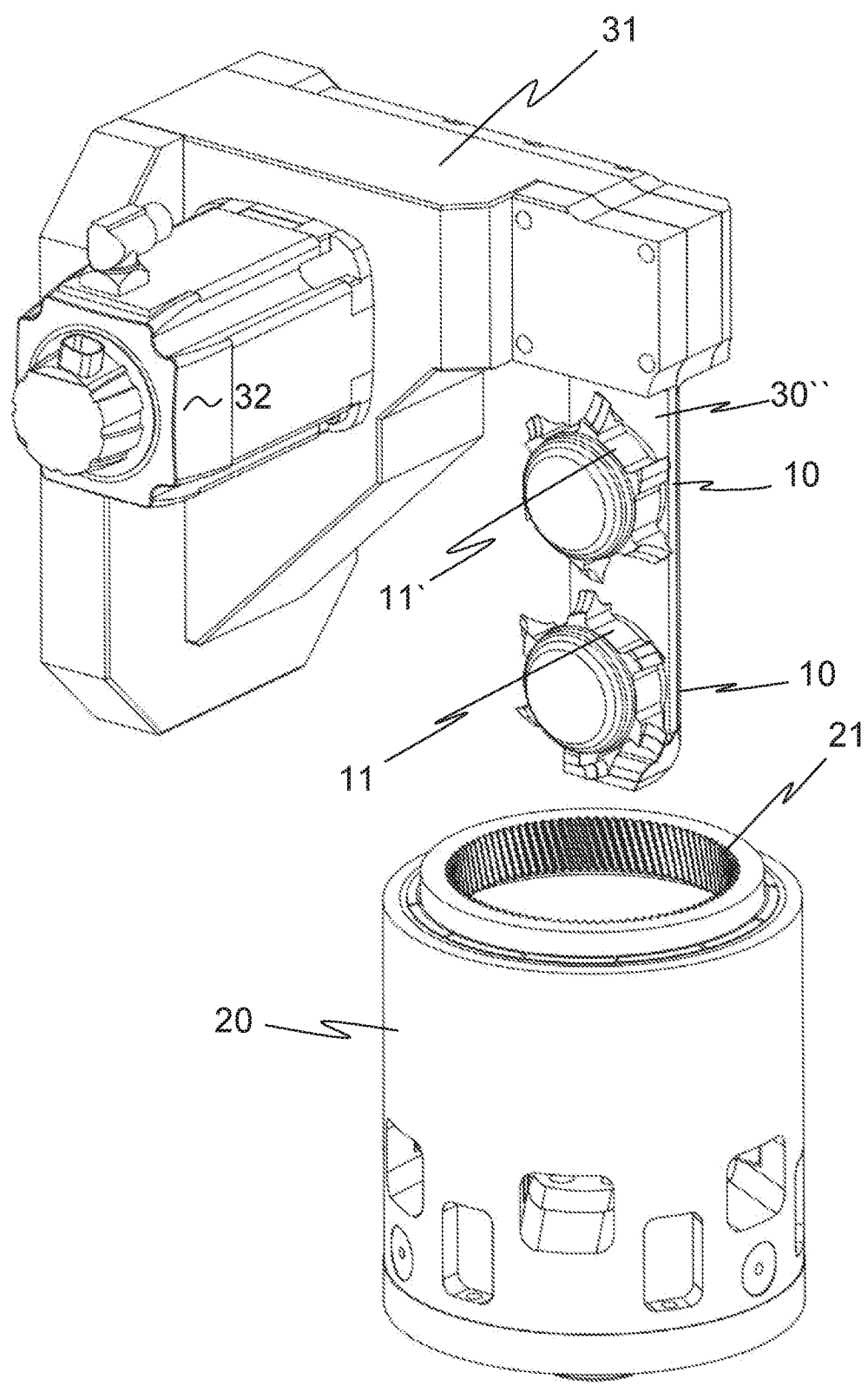
FIG. 12: a third embodiment of the apparatus in accordance with the disclosure, with two tool holders being arranged at the internal hob arm.

FIGS. 10 and 11 show in the same manner the machining of the lower edge 27 and the upper edge 29 of a second workpiece 21 by the second chamfer hob 11' held at the second internal hob arm 30'.

Alternatively, the two internal hob arms 30 and 30' can also be used to machine the lower edge 27 of a workpiece with the one internal hob arm 30 and to machine the upper edge of the same workpiece 21 with the other internal hob arm 30'. In this case, the chamfer hobs of the two internal hob arms possibly work with reversed directions of rotation in order thus to achieve the same cutting direction with respect to the gearing.

The use of two internal hob arms for machining the lower edge and upper edge of the same workpiece is advantageous when a traveling of the chamfer hob through the center of the gearing toward the radially oppositely disposed side is not possible due to a large inner diameter of the workpiece to be machined.

The use of two internal hob arms for machining the lower edge and the upper edge of the same workpiece is also advantageous when the geometry of the workpiece requires different chamfer hobs for machining the lower edge and the upper edge. This can be the case, for example, with conical gearings such a beveloids or workpieces having slanted front sides.

It is common to both application cases of the second embodiment of the present disclosure with two internal hob arms shown in FIGS. 7 to 11 that the one internal hob arm is arranged outside the gearing when the other internal hob arm dips into the center opening of the gearing to machine an edge of the gearing. Certain restrictions with respect to the application possibilities hereby result.

A third embodiment of the present disclosure is shown in FIGS. 12 to 15 in which two tool holders 10 and 10' are arranged at the same internal hob arm 30".

The two tool holders 10 and 10' are arranged above one another along the internal hob arm 30" in the embodiment. The chamfer hobs 11 and 11' held at the two tool holders 10 and 10' possibly serve the machining of the lower edge and the upper edge of a workpiece 21.

The third embodiment furthermore shows, in addition to the further tool holder at the internal hob arm, a somewhat deeper cup of the workpiece holder to hold the lower chamfer hob when the upper chamfer hob is used for machining the edge on the upper side.

The third embodiment is similar to the second embodiment shown in FIGS. 1 to 6 so that reference is initially made to the description there.

The two tool holders 10 and 10' are together drive-connected to the drive 32 via a drivetrain. On the machining of the respective edge regions, the two chamfer hobs, however, possibly work with reversed directions of rotation.

FIG. 13 first shows the dipping of the free end with the sensor 60 into the gearing to be able to carry out a threading or meshing of the chamfer hobs into the gearing.

Figure 14:
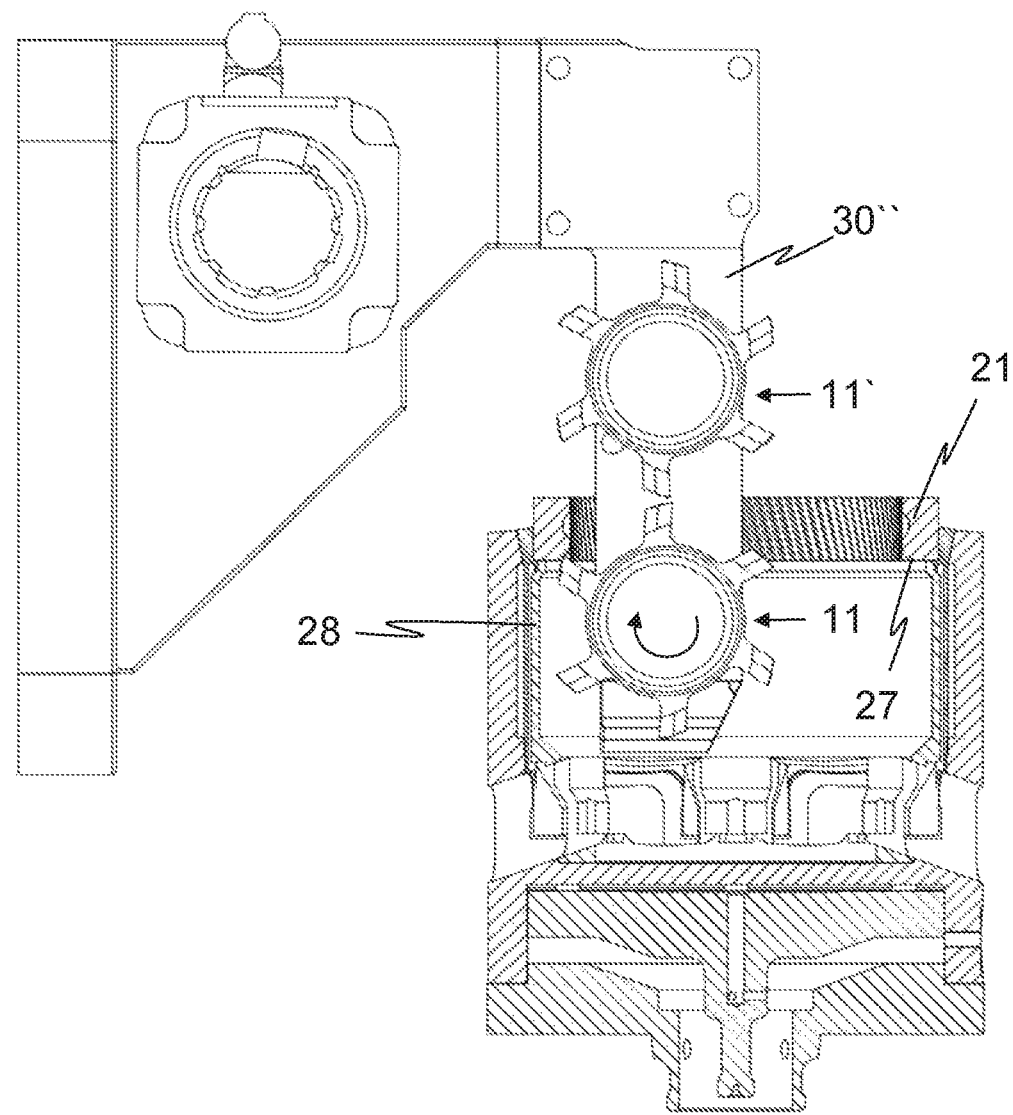
FIG. 14: the apparatus shown in FIGS. 12 and 13 in a side view, with the chamfer hob held in the lower tool holder for machining the edge of the gearing on the lower side of the workpiece with a first direction of rotation being used.
Figure 15:
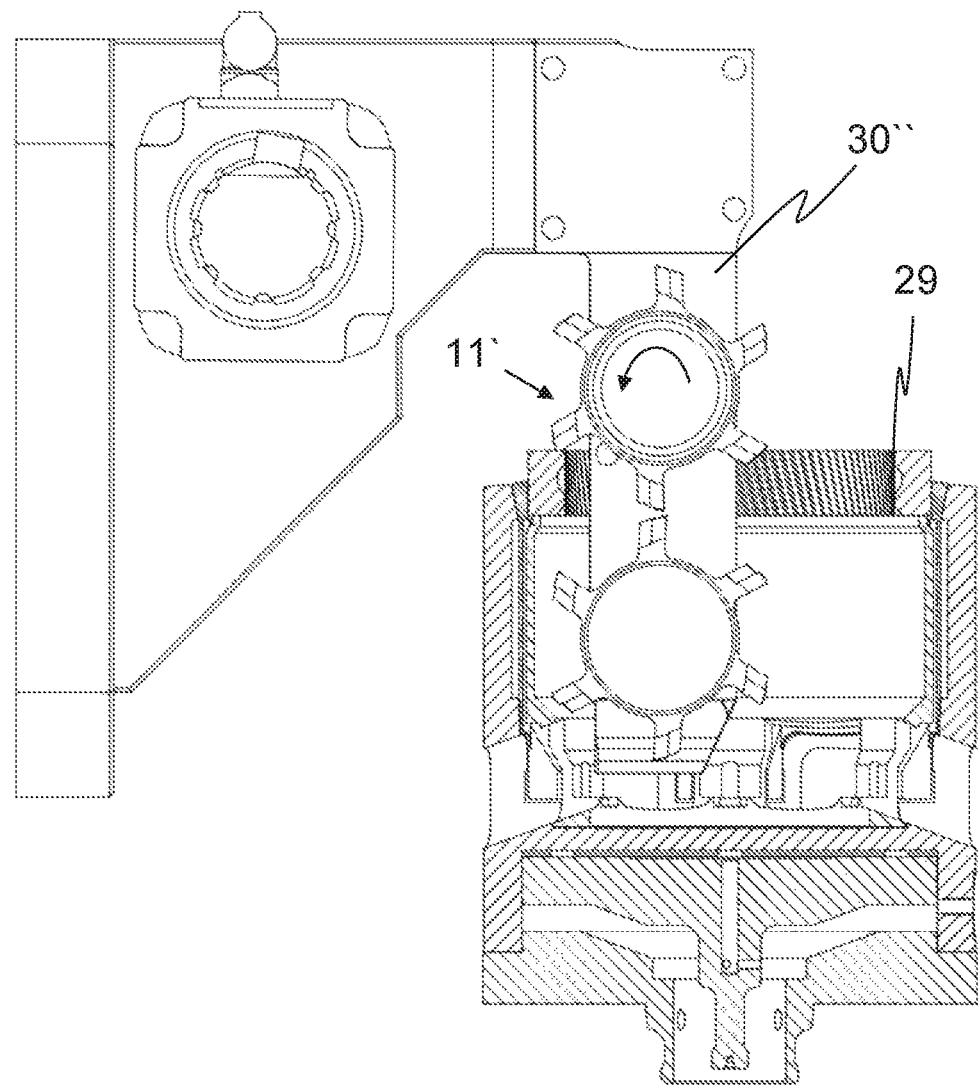
FIG. 15: the embodiment shown in FIGS. 12 to 14, with the chamfer hob held in the upper tool holder for machining the edge of the gearing on the upper side of the workpiece being used, with the reverse direction of rotation being used.

FIG. 14 then shows the machining of the edge 27 on the lower side of the workpiece 21 by the lower chamfer hob 11. FIG. 15 shows the machining of the edge 29 on the upper side of the workpiece 21 by the upper chamfer hob 11'. The machining takes place with respectively reversed directions of rotation so that the same cutting direction results relative to the gearing.

A traveling of the internal hob arm 30" in the direction of the axis of rotation C3 of the workpiece holder takes place between the two machining steps to bring the one hob out of engagement with the edge associated with it and to bring the other hob into engagement with the other edge.

As can be seen in FIGS. 14 and 15, the machining of the edges by both hobs takes place on the same radial side of the workpiece, and possibly on the side facing the machining head.

The third embodiment can therefore also be used with workpieces having a very large inner diameter.

Alternatively to the third embodiment in FIGS. 14 and 15, however, a movement through the center of the workpiece would also be possible in accordance with the second aspect on the use of the internal hob arm shown there having two tool holders. In this case, the two chamfer hobs possibly work with the same direction of rotation.

The third embodiment and the just described alternative are possibly suitable for cases in which different chamfer hobs have to be used for the edges on the upper side and lower side due to the geometry of the workpiece.

In a fourth embodiment not shown in the Figures, a machining of the edges on the upper side and on the lower side of the workpiece can be achieved with the same chamfer tool alternatively to the second aspect of the present disclosure in that the tool holder 10 in the embodiment shown in FIGS. 1 to 6 is rotatable about a pivot axis perpendicular to the axis of rotation B3. Instead of a traveling of the tool holder in the radial direction with respect to the axis of rotation of the workpiece holder toward the oppositely disposed side of the workpiece, the tool holder can therefore be rotated with the chamfer hob to machine the other edge of the workpiece in the same radial position.

It would, for example, be conceivable to design the lower part of the internal hob arm 30 with the workpiece holder 20 as rotatable with respect to the upper part of the internal hob arm or to the connection with the mount 31. An axis of rotation can possibly be provided that extends in parallel with the main direction of the internal hob arm 30. The drivetrain extending through the internal hob arm has to be designed accordingly such that a drive of the tool holder is possible in both pivot positions.

Such a pivot axis could be designed as an adjustment axis that permits a pivoting of the front part of the internal hob arm with the tool holder 10 between the two positions required for the machining of the lower edge and the upper edge.

A chamfer cut hob is possibly also configured as a chamfer hob within the framework of the disclosure independently of the specific embodiments. A chamfer cut hob is a disk-shaped deburring tool that has cutting teeth 12 and flutes at the periphery, possibly each having the same peripheral spacing.

The profile of the cutting teeth 12 of the chamfer cut hob is possibly specifically designed for the chamfer machining of the edge of an internal gearing.

The cutting teeth have a helical extent in the peripheral direction. The chamfer cut hob has multiple threads, with one tooth being provided per thread. The cutting edges formed at the side of the teeth at the front in the direction of rotation are, however, disposed on a common circle of rotation. To chamfer an edge with the chamfer cut hob, the rotational movement between the chamfer cut hob and the workpiece is synchronized such that a respective tooth meets a tooth gap of the workpiece.

With a straight-toothed gear, the profile of the cutting edges of the cutting teeth is symmetrical to the center plane of the deburring tool. It is asymmetrical in contrast with the obliquely toothed gear.

For chamfering, the chamfer cut hob 11 is brought into a position such as is shown in FIG. 5. During the machining of the front edges of the tooth grooves, the workpiece 21 and the chamfer cut hob 11 rotate in a predefined speed ratio so that a respective cutting tooth 12 machines the front edges of a tooth groove. It is understood that the chamfer cut hob 11 or the teeth 12 are configured in accordance with the parameters of the gearing of the workpiece 21 so that the desired engagement with the front edges of the tooth grooves can take place.

The apparatus in accordance with the disclosure possibly has a control by which the axes of rotation of the tool holder and the workpiece holder as well as the machine axes are controlled to adjust the relative position between the tool holder and the workpiece holder. The control possibly controls the apparatus in accordance with the disclosure automatically. It is possibly programmed such that the methods or manners of application of the apparatus in accordance with the disclosure described in more detail above are carried out in an automated manner.

The apparatus in accordance with the disclosure for chamfering workpieces can be used in a machining center in combination with a gear cutting machine that generates the gearing at the workpiece beforehand. The gear cutting machine is possibly a machine for machining internal gearings, possibly a milling machine or a chamfer cut deburring device or a skiving machine.

The gear cutting machine and the apparatus in accordance with the disclosure can each have separate workpiece holders, with a workpiece changer being provided to transport the workpieces from the gear cutting machine to the apparatus for chamfering in accordance with the disclosure. Alternatively, the workpieces can remain clamped on a workpiece holder and can be transported on the workpiece holder from the gear cutting machine to the apparatus in accordance with the disclosure.

Figure 16:
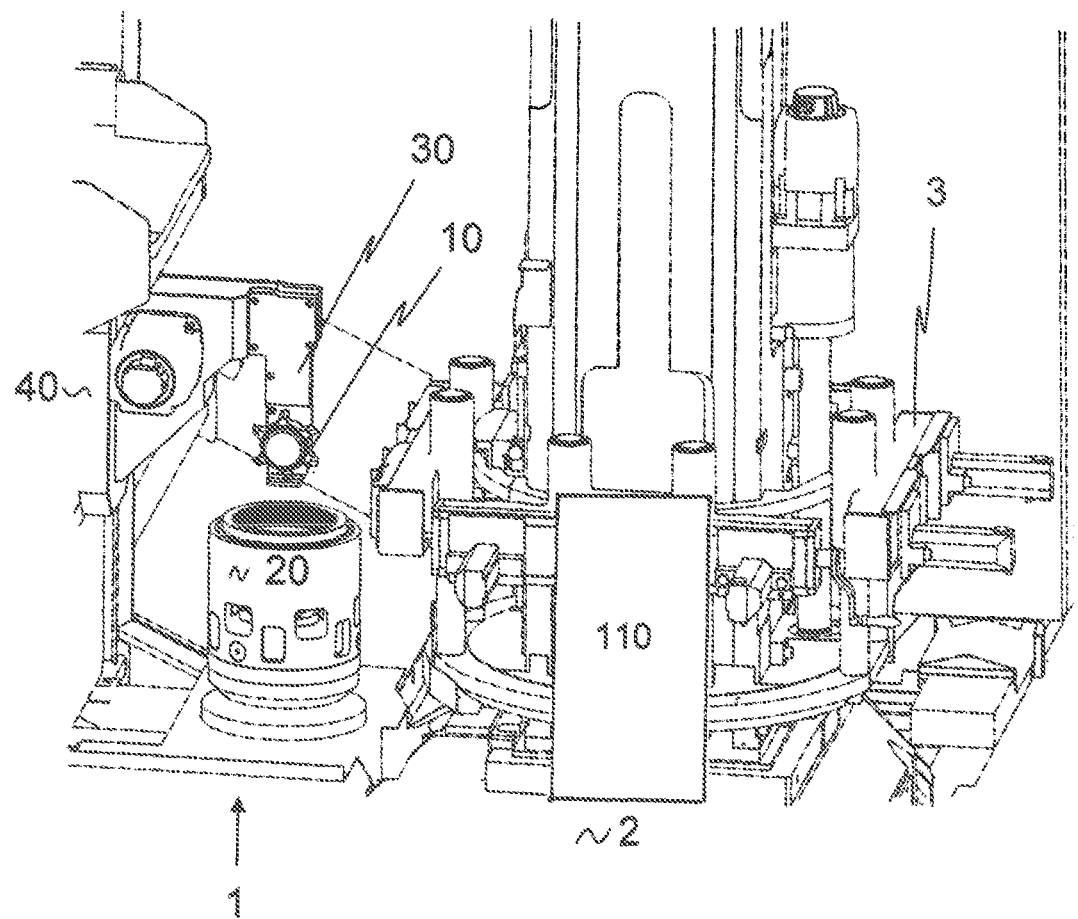
FIG. 16: a perspective view of a gear cutting center with the first embodiment of the apparatus in accordance with the disclosure and a ring loader.

An embodiment of a gear cutting center is shown in FIG. 16, with the apparatus 1 in accordance with the disclosure in accordance with the first embodiment being shown at the left. All the other embodiments of the present disclosure could, however, also be used.

The workpiece holder 20 is fixedly associated with the apparatus in accordance with the disclosure in the embodiment and is loaded with workpieces via a ring loader 3. The gear cutting machine 110 schematically shown in FIG. 16 is arranged at a different angular position 2, for example at an angle of 90° to the apparatus 1 in accordance with the disclosure, relative to the ring loader 3. The ring loader 3 can therefore transport workpieces gear manufactured in the gear cutting machine to the apparatus in accordance with the disclosure. The workpieces can optionally also be transported back to the gear cutting machine again, for example to enable a chamfering between a rough machining step and a fine machining step.

The invention claimed is:

1. An apparatus for chamfering at least one edge of a gearing at a front side of a workpiece having internal gearing, the apparatus comprising at least one rotatably supported workpiece holder for holding the workpiece, at least one rotatably supported tool holder for holding at least one chamfer hob, at least one machine axis, and a controller for controlling the at least one machine axis, wherein the controller is configured to control the machine axis to bring the chamfer hob into engagement with the at least one edge of the gearing for chamfering the at least one edge of the gearing, wherein the tool holder is arranged at an internal hob arm, and wherein the controller is configured to control the at least one machine axis to travel a free end of the internal hob arm at least partly into a center opening formed by the internal gearing of the workpiece for chamfering the at least one edge of the gearing.

2. The apparatus of claim 1, wherein the machine axis, via which the free end of the internal hob arm can be traveled into the center opening, does not extend into the center opening of the workpiece and is arranged above or next to the workpiece holder, and the machine axis enabling a traveling of the internal hob arm in an axial direction of the workpiece holder.

3. The apparatus of claim 1, wherein a drivetrain extends in the internal hob arm and connects a drive arranged on a basis of the internal hob arm through the internal hob arm to the tool holder arranged at the free end of the internal hob arm, and the drivetrain having a plurality of gears that mesh with one another and are arranged along the internal hob arm and/or having a belt drive and/or a chain drive extending within the internal hob arm.

4. The apparatus of claim 1, comprising a sensor for threading and/or meshing the chamfer hob into the internal gearing of the workpiece, the sensor being arranged at the free end of the internal hob arm below the tool holder.

5. The apparatus of claim 1, wherein the tool holder is rotatable by 180° over a pivot axis perpendicular to its axis of rotation, with the pivot axis being arranged at the internal hob arm, and extending in parallel with a main extension of the internal hob arm, and further to enable a pivoting of a lower part of the internal hob arm together with the workpiece holder with respect to an upper part of the internal hob arm or to a connection with a mount.

6. The apparatus of claim 1, wherein the controller is configured for an automatic control of the at least one machine axis for chamfering a first and a second edge of the gearing on upper and lower front sides of the workpiece.

7. The apparatus of claim 1, included in a gear manufacturing machining center further including a gear cutting machine and a workpiece changer with a gear manufacturing machining of workpieces on the gear cutting machine and a chamfering of the workpieces on the apparatus of claim 1 taking place with parallel cycle times and the workpiece changer moving workpieces provided with a gearing on the gear cutting machine to the apparatus of claim 1 for chamfering.

8. The apparatus of claim 1, wherein the controller is configured to control the at least one machine axis to bring the chamfer hob into engagement with the at least one edge of the gearing for chamfering the at least one edge of the gearing with the chamfer hob extending partly above the at least one edge in a region extending from the at least one edge to an external radius of the gearing and partly below the at least one edge in a region extending from the at least one edge to a center point of the gearing.

9. The apparatus of claim 1, comprising a first drive for rotating the tool holder about a first axis of rotation and a second drive for rotating the workpiece holder about a second axis of rotation, wherein the controller is configured to control the first and the second drive to synchronize a rotation of the tool holder with a rotation of the workpiece holder such that cutting edges formed on teeth arranged on a circumference of the chamfer hob successively meet successive tooth gaps of the gearing of the workpiece.

10. The apparatus of claim 1, wherein the controller is configured to control the at least one machine axis to travel the free end of the internal hob arm into the center opening such that the chamfer hob dips at least partly into the center opening to machine a first edge of the gearing on an upper side of the gearing, and to travel the tool holder through the center opening of the workpiece without contacting a geared internal surface of the internal gearing, and to bring the chamfer hob into engagement with a second edge of the gearing on a lower side of the workpiece, the geared internal surface of the internal gearing extending between the first edge and the second edge.

11. The apparatus of claim 10, wherein the workpiece holder has a cup-shaped recess and permits a traveling of the chamfer hob below the second edge of the gearing on the lower side of the workpiece facing the cup-shaped recess, wherein the controller is configured to control the at least one machine axis such that the chamfer hob extends partly in a region below the second edge extending from the second edge to an external radius of the gearing and partly in a region above the second edge extending from the second edge to a center point of the gearing when the chamfer hob is in engagement with the second edge of the gearing for chamfering the second edge of the gearing.

12. The apparatus of claim 1, comprising at least a first and a second tool holder for holding chamfer hobs, the controller being configured to control the at least one machine axis to bring a first chamfer hob held in the first tool holder into engagement with the first edge of the searing for chamfering the first edge and to bring a second chamfer hob held in the second tool holder into engagement with the second edge of the searing for chamfering the second edge.

13. The apparatus of claim 12, wherein the first and the second tool holder are arranged above one another along the internal hob arm.

14. The apparatus of claim 12, wherein the first and the second tool holder are arranged at separate internal hob arms.

15. An apparatus for chamfering at least one front-side edge of a gearing of a toothed workpiece having at least one rotatably supported workpiece holder for holding the workpiece and having at least one rotatably supported tool holder for holding at least one chamfer hob with the tool holder being travelable over at least one machine axis relative to the workpiece holder, wherein the apparatus permits a chamfering of edges of the gearing on both front sides of the workpiece by the same chamfer hob in that the chamfer hob held in the tool holder is brought into engagement with a first edge region of the gearing on a first side of the workpiece in a first radial direction with respect to an axis of rotation of the workpiece holder and, by traveling the tool holder relative to the workpiece holder, is brought into engagement with a radially oppositely disposed second edge region of gearing on a second side of the workpiece in a second radial direction with respect to the axis of rotation of the workpiece holder.

16. The apparatus of claim 15, wherein the tool holder is arranged at a chamfer arm, with the chamfer hob held in the tool holder being accessible from two sides disposed opposite to each other with respect to a plane extending parallel to an axis of rotation of the tool holder and a main extension of an internal hob arm such that its first side can be brought into engagement with the first edge region on an upper side of the workpiece and its second side can be brought into engagement with the second edge region on a lower side of the workpiece, with a radius of a chamfering tool extending on the two sides beyond the tool holder and the chamfer arm.

17. The apparatus of claim 15, wherein the tool holder is arranged at an internal hob arm whose free end can be traveled by the machine axis of the apparatus at least partly into a center opening formed by the internal gearing of the workpiece.

18. The apparatus of claim 15, comprising a control for automatic control of the machine axis for chamfering the edges of the gearing on both front sides of the workpiece.

19. The apparatus of claim 15, included in a gear manufacturing machining center further including a gear cutting machine and a workpiece changer, with a gear manufacturing machining of workpieces on the gear cutting machine and a chamfering of the workpieces on the apparatus of claim 11 taking place with parallel cycle times, and the workpiece changer moving workpieces provided with a gearing on the gear cutting machine to the apparatus of claim 11 for chamfering.

20. A method of chamfering at least one front-side edge of a gearing of a workpiece having internal gearing, the method including an apparatus comprising at least one rotatably supported workpiece holder for holding the workpiece and a chamfering performed by a chamfer hob held in a rotatably supported tool holder, wherein the tool holder is arranged at an internal hob arm whose free end is traveled for chamfer machining of a first edge of the internal gearing at least partly into a center opening formed by the internal gearing of the workpiece.

21. The method of claim 20, wherein the tool holder is traveled through the center opening of the workpiece by traveling the internal hob arm to bring the chamfer hob into engagement with a second edge of the gearing on a lower side of the workpiece without contacting a geared internal surface of the internal gearing, the geared internal surface of the internal gearing extending between a first edge and the second edge.

22. The method of claim 20 wherein a chamfering of edges of the gearing takes place on both front sides of the workpiece by the same chamfer hob in that the chamfer hob held in the tool holder is brought into engagement with a first edge region of the gearing on a first side of the workpiece in a first radial direction with respect to an axis of rotation of the workpiece and, by traveling the tool holder relative to the workpiece, is brought into engagement with a radially oppositely disposed second edge region of the gearing on the second side of the workpiece in a second radial direction with respect to the axis of rotation of the workpiece.

23. The method of claim 22, further comprising use of a chamfer cut hob.

* * * * *